(12) United States Patent
Hungerford

(10) Patent No.: US 6,789,384 B2
(45) Date of Patent: Sep. 14, 2004

(54) ADJUSTABLE HOOK AND CHAIN

(76) Inventor: Gordon T. Hungerford, 25618 Coltrane Dr., Damascus, MD (US) 20872

( * ) Notice: Subject to any disclaimer, the term of this patent is extended or adjusted under 35 U.S.C. 154(b) by 0 days.

(21) Appl. No.: 10/287,477

(22) Filed: Nov. 5, 2002

(65) Prior Publication Data

US 2004/0083710 A1 May 6, 2004

(51) Int. Cl.[7] .............................. F16G 11/14; B66C 1/40
(52) U.S. Cl. ............................................ 59/93; 294/82.1
(58) Field of Search ............................ 59/93; 294/82.1, 294/74; 116/200, 212

(56) References Cited

U.S. PATENT DOCUMENTS

| | | |
|---|---|---|
| 1,119,636 A | 12/1914 | Richter |
| 1,295,738 A | 2/1919 | Hagar |
| 1,410,770 A | 3/1922 | Silverman et al. |
| 1,605,187 A * | 11/1926 | Holt .......................... 294/82.1 |
| 1,867,574 A * | 7/1932 | Leman ...................... 294/82.1 |
| 2,552,219 A | 5/1951 | Schleicher |
| 2,620,160 A * | 12/1952 | Ray ........................... 294/82.1 |
| 2,640,506 A | 6/1953 | Consoletti |
| 2,651,533 A | 9/1953 | Miller |
| 2,801,120 A | 7/1957 | Shepard |
| 2,812,971 A | 11/1957 | Teutsch |
| 3,009,500 A | 11/1961 | Russel |
| 3,282,045 A | 11/1966 | Thelan |
| 3,511,527 A | 5/1970 | Gower |
| 3,677,424 A | 7/1972 | Anderson |
| 3,850,468 A * | 11/1974 | Hultin .......................... 59/93 |
| 3,912,318 A * | 10/1975 | Engh ......................... 294/82.1 |
| 4,221,252 A | 9/1980 | Bruce |
| 4,335,489 A * | 6/1982 | Muller et al. .................. 59/93 |
| 4,413,386 A * | 11/1983 | Sato ......................... 294/82.1 |
| 4,910,833 A | 3/1990 | Barbour et al. |
| 5,159,729 A | 11/1992 | Walker |
| 5,601,326 A * | 2/1997 | Smetz ....................... 294/82.1 |
| 5,778,827 A | 7/1998 | Hansen |

* cited by examiner

*Primary Examiner*—David Jones
(74) *Attorney, Agent, or Firm*—Richard C. Litman

(57) ABSTRACT

An adjustable hook and chain is disclosed for lashing cargo and handling loads such as a dumpster or trailer. In one aspect of the invention, the adjustable chain comprises an adjustable hook attached to an elongated flexible member such as a chain, cable, or rope. In another aspect of the invention, the adjustable hook comprises a female shank with a hollow bore comprising a first shank thread; a male longitudinal member adapted to fit the female shank, wherein the male member comprises an upper region with a first male thread that complements the first shank thread, and a lower region; and a hook attached to the lower region of the male member. In another aspect of the invention, a turning member is used to rotate the female shank or male member without rotating the hook or elongated flexible member.

18 Claims, 22 Drawing Sheets

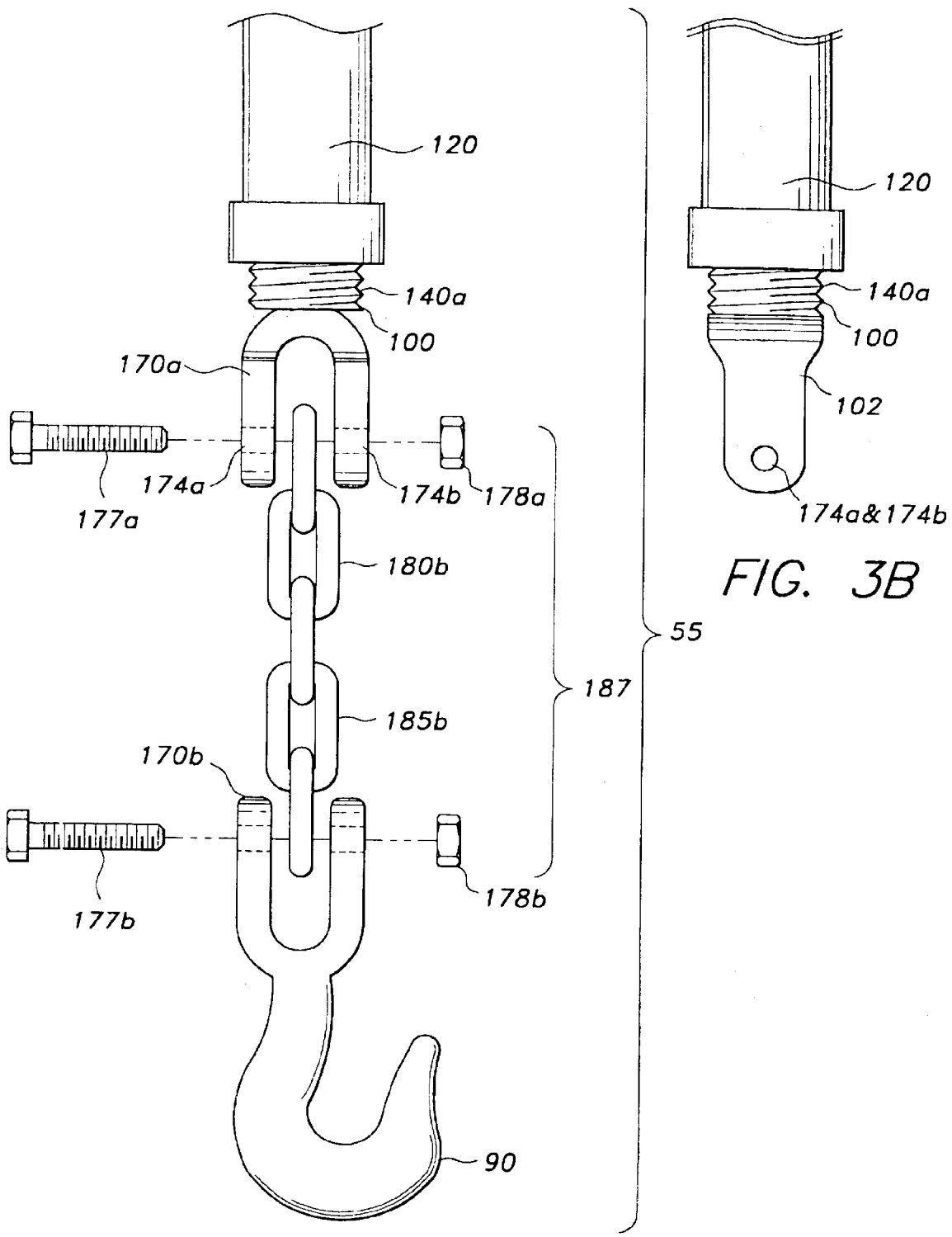

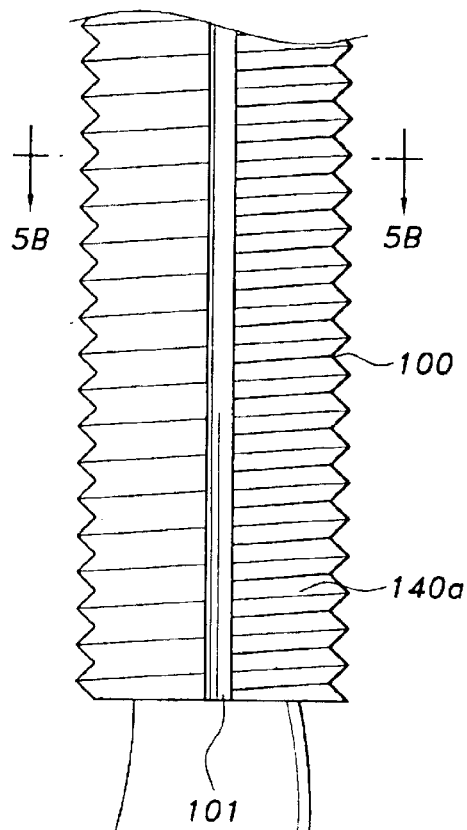
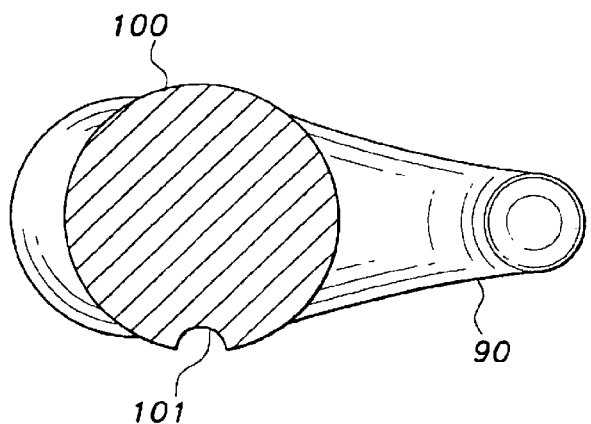
FIG. 5B
FIG. 5A

ADJUSTABLE HOOK AND CHAIN

BACKGROUND OF THE INVENTION

1. Field of the Invention

The present invention relates to an adjustable hook and chain to provide adjustable length and tension in a load securing system for use in storing, securing, and handling cargo in such activities as construction, cargo hauling and storage, and securing a roll on/off dumpster to a dumpster hauling truck or freight to commercial trucks and flat bed trailers.

2. Description of the Related Art

Tasks involving handling heavy loads are frequently time consuming and frustrating to complete. For example, securing cargo to a commercial truck, a crane hook to a load, hitching a trailer to a truck, and attaching a drag cable to a roll on/off dumpster for hauling onto a dumpster truck all involve precision tasks wherein some kind of attachment or securing device is positioned precisely and carefully relative to the position of the cargo. Time is frequently wasted because, for example, a chain is slightly too short or too long to safely to tie down a load to a flat bed truck. Frustration can result, for example, when a dumpster securing cable is slightly too short to attach to a trash filled roll on/off dumpster forcing the operator to return to a dumpster truck to wind off a few more inches of cable to successfully connect up to the dumpster. Hence, there is a need for a safe and adjustable chain or cable that can provide a few inches of adjustable play, in either direction, in a cable or chain to assist the operator in securing, for example, a load to a trailer or a truck to a trailer.

Several efforts have been made to address these problems. U.S. Pat. No. 1,119,636 issued Dec. 1, 1914 to P. C. Richter, describes a hook and chain coupling having a link secured thereto via a removable pin type connector. However, the '636 coupling is not adjustable.

U.S. Pat. No. 1,295,738 issued Feb. 25, 1919 to G. D. Hagar, describes a grip chain coupling with a threaded hook element. The '738 device is not adapted for use in securing cargo and, in particular, to tying down and securing cargo to moving vehicles. More particularly, the '738 device does not provide a safety feature that informs the user when the device is being used in a safe or, more pertinently, unsafe manner.

U.S. Pat. No. 5,159,729 issued Nov. 3, 1992 to W. T. Walker, describes a tie-down device for securing and holding down cargo. The device includes a turnbuckle. A strap is provided having a first end and a second end that are secured to the turnbuckle, so as to loop back on itself thereby defining a loose strap and a stationary strap. A first hook is carried by the turnbuckle. A second hook is carried by the strap between the loose and stationary straps. Rotation of the turnbuckle in a first tightening direction wraps the loose strap around the stationary strap, shortening the loose strap for tightening the device and securing and holding down the cargo and also locking the loose strap in place. Rotation of the turnbuckle in a second loosening direction unwraps the loose strap from around the stationary strap, lengthening the loose strap for untightening the device and unsecuring and releasing the cargo. The '729 tie-down device is overly complicated to use and relies on failure of the stationary strap in preference to the loose strap to inform the user that the tie-down device is being used in an unsafe manner. There is a need for a less complicated and safer to use tie-down device.

Other patents showing devices or apparatus for handling loads or cargo but which do not solve the above mentioned problems include U.S. Pat. No. 1,410,770, issued Mar. 28, 1922 to H. Silverman (fastening device for necklace); U.S. Pat. No. 2,552,219, issued May 8, 1951 to R. W. Schleicher (die lifting hook); U.S. Pat. No. 2,640,506, issued Jun. 2, 1953 to P. C. Consoletti (harness frame suspending device); U.S. Pat. No. 2,651,533, issued Sep. 8, 1953 to C. Miller (swivel); U.S. Pat. No. 2,801,120, issued Jul. 30, 1957 to H. Shepard (swivel joint for aluminum boat fittings); U.S. Pat. No. 2,812,971, issued Nov. 12, 1957 to J. H. Teutsch (hoist lift connection for dies); U.S. Pat. No. 3,009,500, issued Nov. 21, 1961 to A. E. Russell (adjustable anti-skid chains); U.S. Pat. No. 3,282,045, issued Nov. 1, 1966 to Y. Thelan (means for an eye-link for chains); U.S. Pat. No. 3,511,527, issued May 12, 1970 to R. L. Gower (head for weldless connectors); U.S. Pat. No. 3,677,424, issued Jul. 18, 1972 to W. G. Anderson (invalid lifting apparatus); U.S. Pat. No. 4,910,833, issued Mar. 27, 1990 to Barbour et al. (double-locking anchor chain tensioner); and U.S. Pat. No. 5,778,827, issued Jul. 14, 1998 to M. O. Hansen (cow lift mechanism).

None of the above inventions and patents, taken either singularly or in combination, is seen to describe the instant invention as claimed. Thus, an adjustable hook and chain to solve the aforementioned problems is desired.

SUMMARY OF THE INVENTION

In one aspect of the invention an adjustable chain comprises an elongated flexible member such as a chain, rope or cable attached to an adjustable hook.

In another aspect of the invention, the adjustable hook comprises: a female shank, wherein the female shank has a hollow bore comprising a first shank thread, an upper end and an opposite lower end; a male longitudinal member comprising an upper region with a first male thread that complements the first shank thread, and a lower region, wherein the upper region is adapted to fit inside the bore; and a hook on the lower region of the male member.

In one form of the invention, the elongated flexible member is attached directly or indirectly via a first attachment mechanism to the upper end of the female shank. A hook is attached directly or indirectly via a second attachment mechanism to the lower region of the male member to provide the adjustable chain. When the male member is screwed into or out of the female shank the hook position may be varied relative to the female shank thus lengthening or shortening the adjustable chain. If both ends of the adjustable chain are attached to fixed points, the tension in the adjustable chain is varied when the male member is screwed into or out of the female shank. A turning member is optionally used to rotate the female shank or male member without rotating the hook or elongated flexible member thereby allowing an operator to easily vary the length of the adjustable chain to secure a load, for example, to a truck.

In one embodiment of the invention, the first male thread comprises a polit hole positioned to provide notice when the male member is over extended from the female shank.

In a further embodiment, the upper region of the male member comprises a male member widened section with a second male thread, and the female shank comprises a widened shank section with a second shank thread which complements the second male thread. The widened shank section is adapted to accommodate the male member widened section.

In a still further embodiment of the invention the widened shank section comprises an internal shank flanking ledge, and the male member widened section comprises a complementary flanking ledge, wherein when the complementary flanking ledge abuts the internal shank flanking ledge, the longitudinal male member is prevented from exiting further from the female shank.

In another embodiment of the invention, the female shank comprises an internal face, and wherein the widened section further comprises a top face. The top face abuts against the internal face when the male member is fully screwed into the female shank thereby providing notice to stop screwing the male member into the female shank.

These and other embodiments of the present invention will become readily apparent upon further review of the following specification and drawings.

BRIEF DESCRIPTION OF THE DRAWINGS

FIG. 3A is an exploded elevational view of the adjustable chain showing an attachment mechanism between a lower region of a male member and a hook.

FIG. 3B is a detail view of the embodiment shown in FIG. 3A.

FIG. 5A is an enlarged scale view of a male member of the adjustable chain comprising an oil galley according to another aspect of the invention.

FIG. 5B is a cross-sectional view taken along lines 5B—5B of FIG. 5A.

Similar reference characters denote corresponding features consistently throughout the attached drawings.

DETAILED DESCRIPTION OF THE PREFERRED EMBODIMENTS

The present invention is directed to an adjustable chain 50 and an adjustable hook 55 to facilitate the storing, securing, and handling of cargo in such activities as construction and cargo hauling, and in particular, for handling and securing cargo to moving vehicles, such as a roll-on/off dumpster to a dumpster truck. The adjustable chain may be used to vary tension applied to secure or tie off a cargo load to, for example, a flat bed truck.

Figure 4:
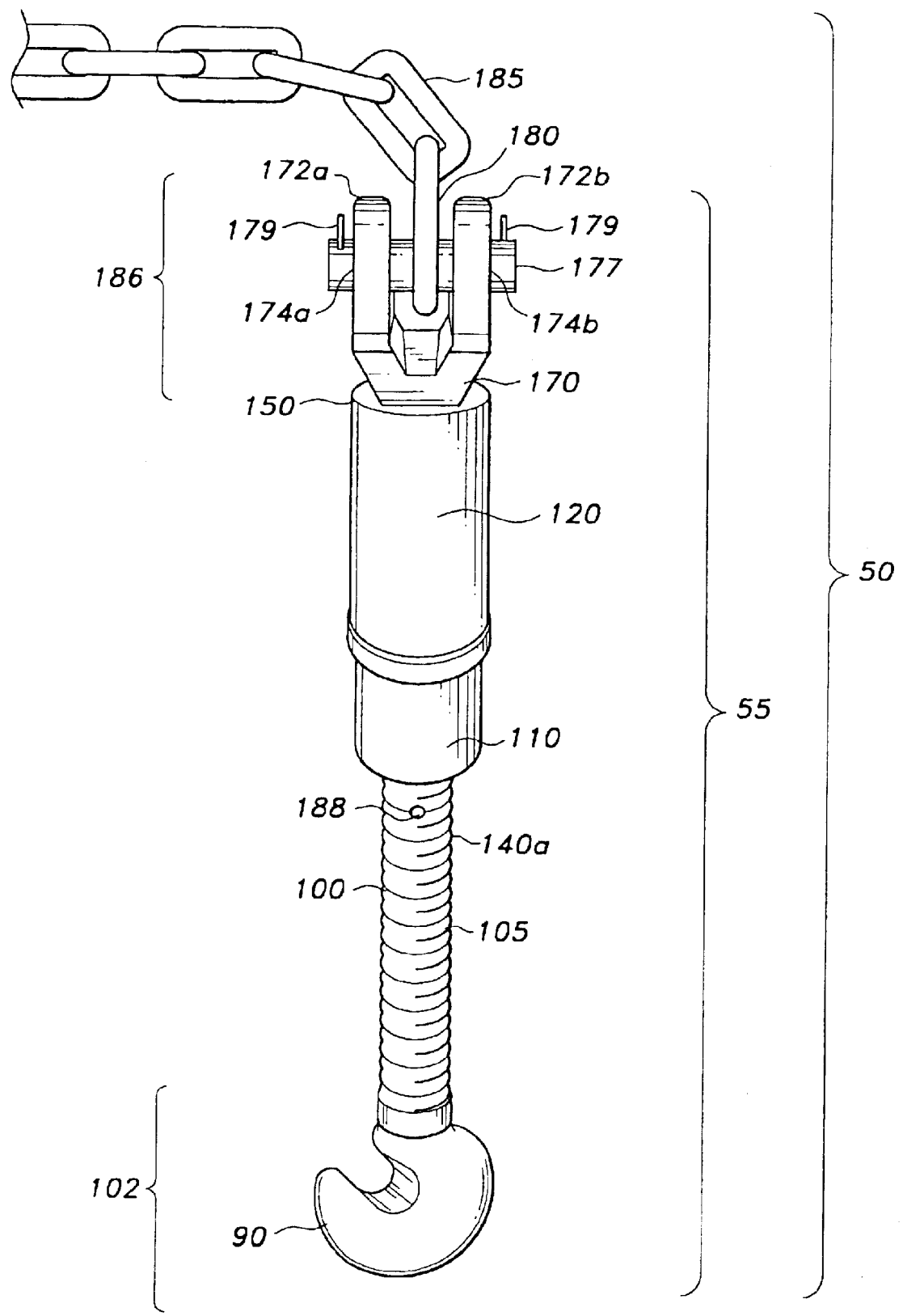
FIG. 4 is a perspective view of the adjustable chain with a pilot hole according to another aspect of the invention.
Figure 4A:
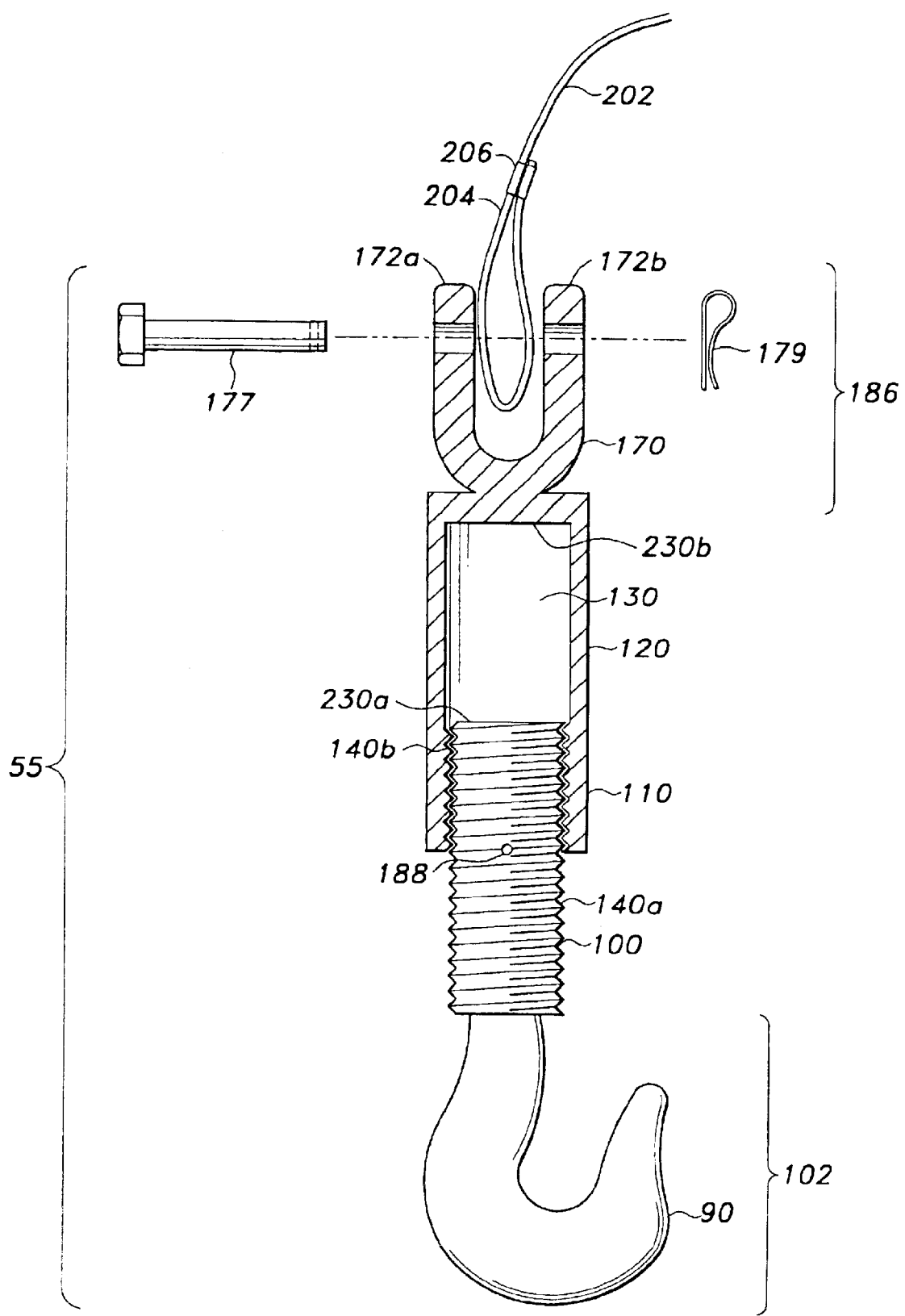
FIG. 4A is a cross-sectional view of the adjustable chain according to another aspect of the invention.

The term "adjustable chain" is intended to mean any adjustable load securing system comprising at least one adjustable hook 55 in combination with an elongated flexible member such as a chain 185 (e.g., see FIG. 2) or functional equivalent thereof such as a rope or cable 202 (e.g., see FIG. 4A).

Figure 1:
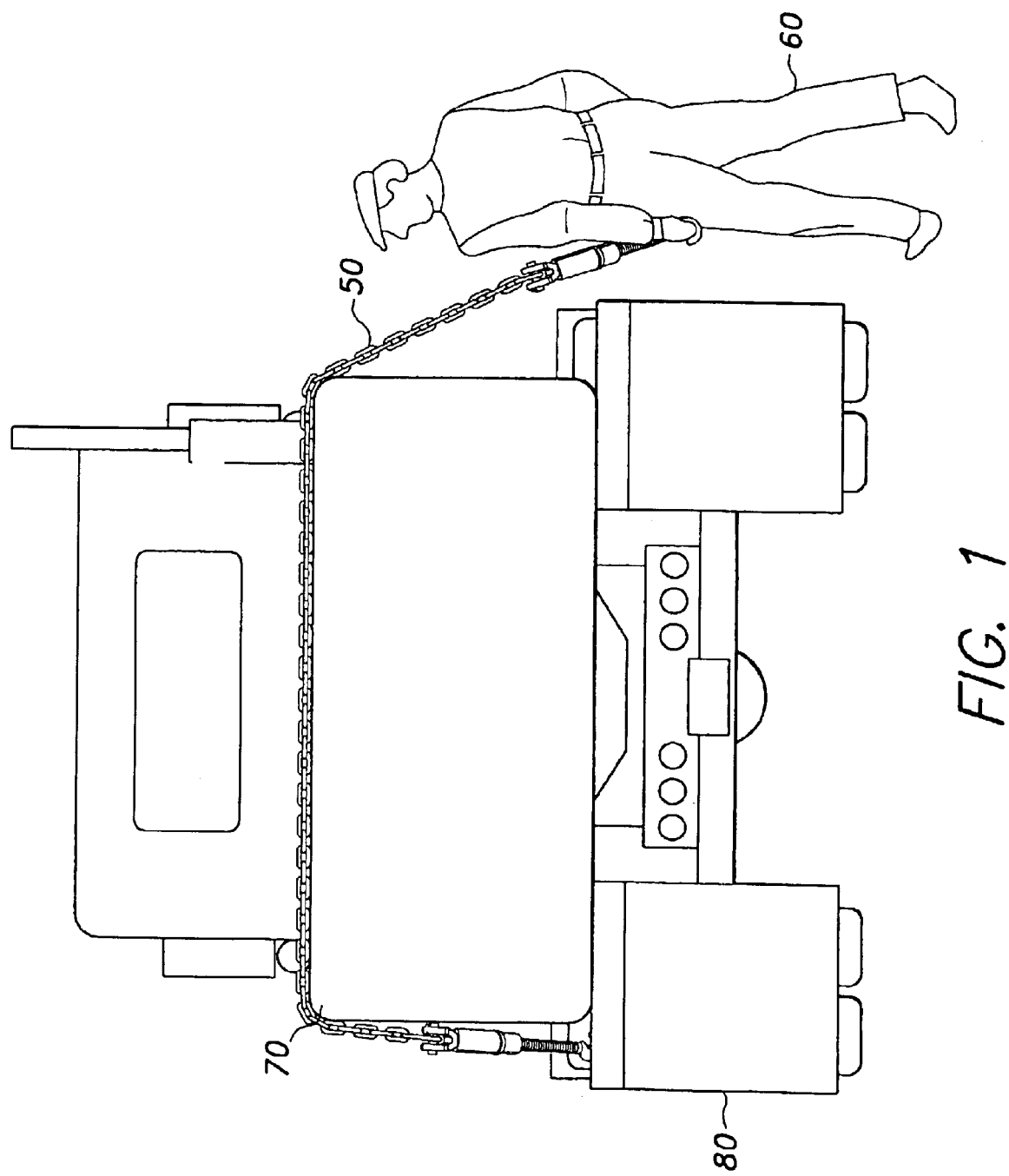
FIG. 1 is an environmental, perspective view of an adjustable chain according to one aspect of the present invention.

FIG. 1 depicts an environmental perspective view of the adjustable chain 50, according to one aspect of the invention. The adjustable chain 50 is shown being adjusted by an operator 60 to secure a load 70 on a cargo truck 80.

Figure 2:
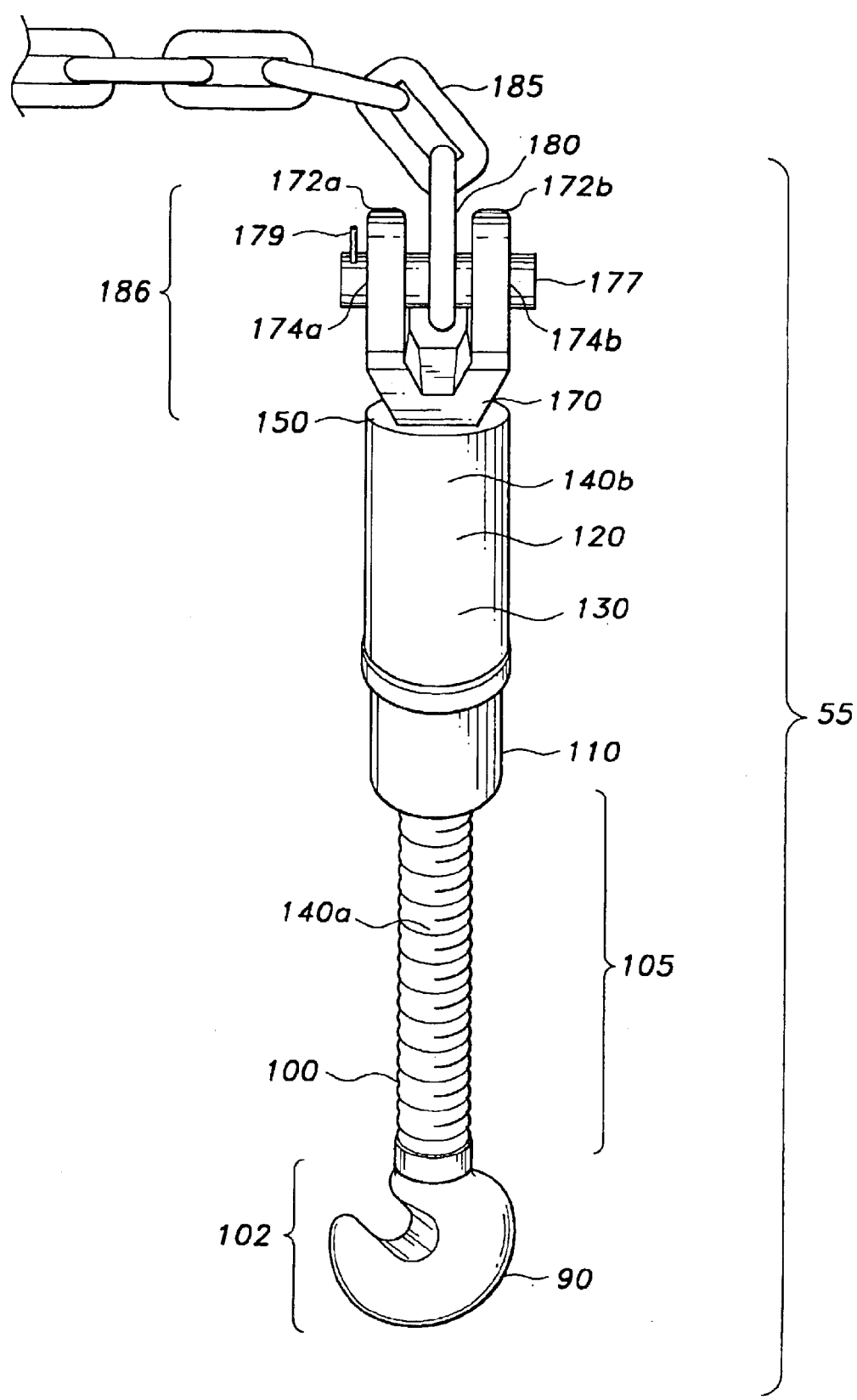
FIG. 2 is a perspective view of the embodiment shown in FIG. 1, with a hook integral with the lower region of a male member, and drawn to an enlarged scale.

Referring to the figures generally, and more particularly FIGS. 2 and 4A, FIG. 2 shows a perspective view of one embodiment of the invention in which the adjustable chain 50 comprises an elongated flexible member in the form of a chain 185 attached to a female shank 120, and a male member 100 screwed into a hollow bore 130 (see e.g. FIG. 4A) of the female shank 120. The lower end 102 of male member 100 comprises a hook 90. The hook 90 may be separate or continuous with the male member 100.

In one embodiment of the invention, the adjustable hook 55 comprises: a female shank 120, wherein the female shank 120 has a hollow bore 130 comprising a first shank thread 140*b*, an upper end 150 and an opposite lower end 110; a male longitudinal member 100 comprising an upper region with a first male thread 140*a* that complements the first shank thread 140*b*, and a lower region 102, wherein the upper region is adapted to fit inside the bore 130; and a hook 90 connected to or continuous with the lower region of the male member 102.

Referring to FIGS. 2, 4A, 4B, and 4C, a male member 100 comprises a lower end 102 terminating in a hook 90, and an upper end 105 comprising a first male thread 140a. The threaded male member 100 is shown, e.g. in FIGS. 2 and 4C, with its upper end 105 at least partly screwed into a first opposite end 110 of a female shank member 120, which comprises an internal hollow bore 130 (visible in the cross-section view of female shank 120 of FIGS. 4A to 4C). In this embodiment of the adjustable chain 50, the hollow bore 130 is at least partly lined with a complementary thread 140b (e.g., see FIG. 4A).

The upper region 105 of the male member 100 can be screwed into and out of the female shank 120 by virtue of the complementary first shank thread 140b and first male member thread 140a. In this embodiment of the adjustable chain 50, the upper end 150 (see e.g., FIG. 2) of the female shank 120 comprises an integral U-shaped member 170, which is attached to a chain link 180 of chain 185. The combination of hook 90, male shank 100, and female shank 120 form an adjustable hook 55, which is attached to the elongated flexible member, such as chain 185, to provide the adjustable chain 50 of the present invention.

Figure 2A:
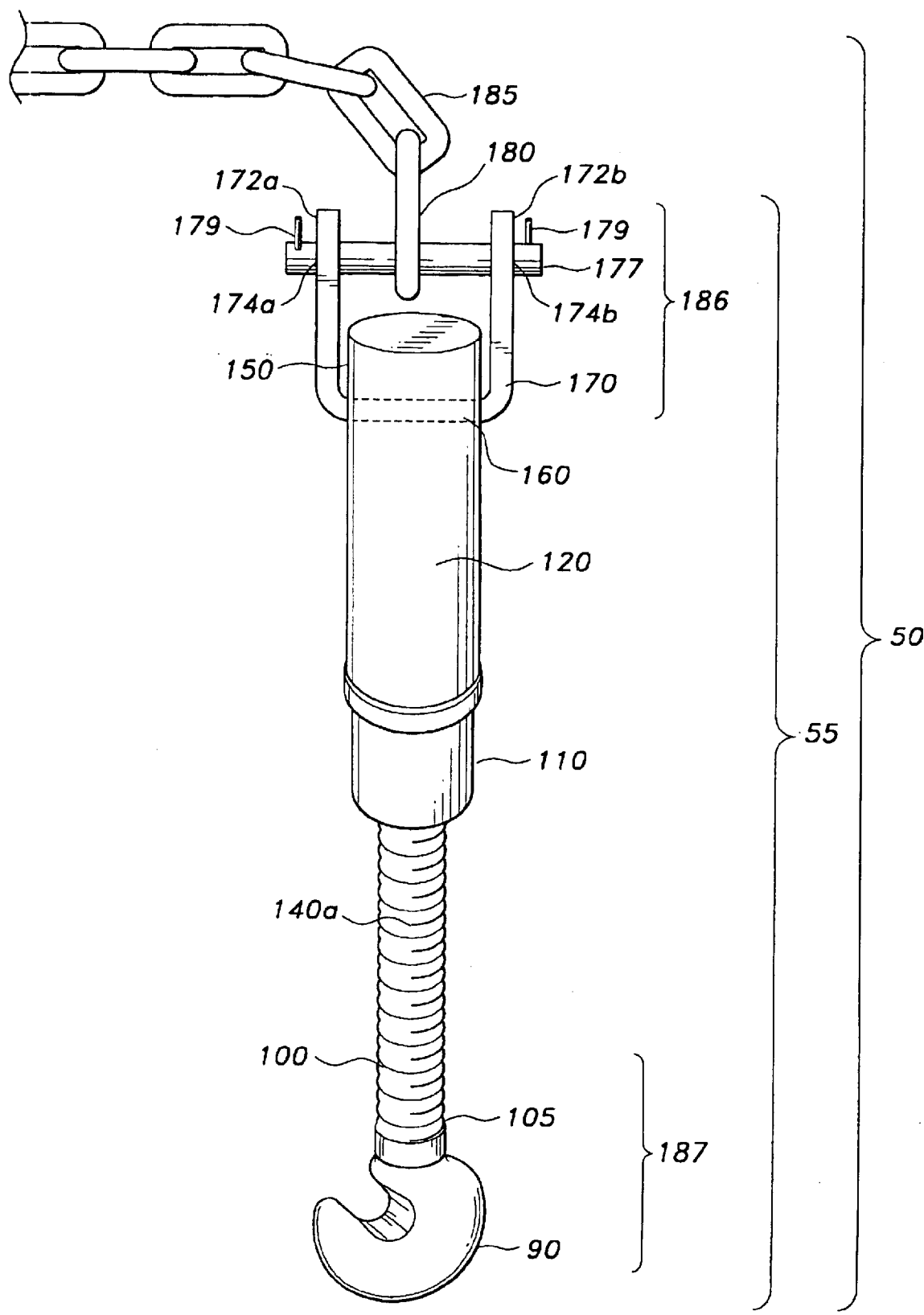
FIG. 2A is a perspective view of the adjustable chain according to a further aspect of the present invention.
Figure 2B:
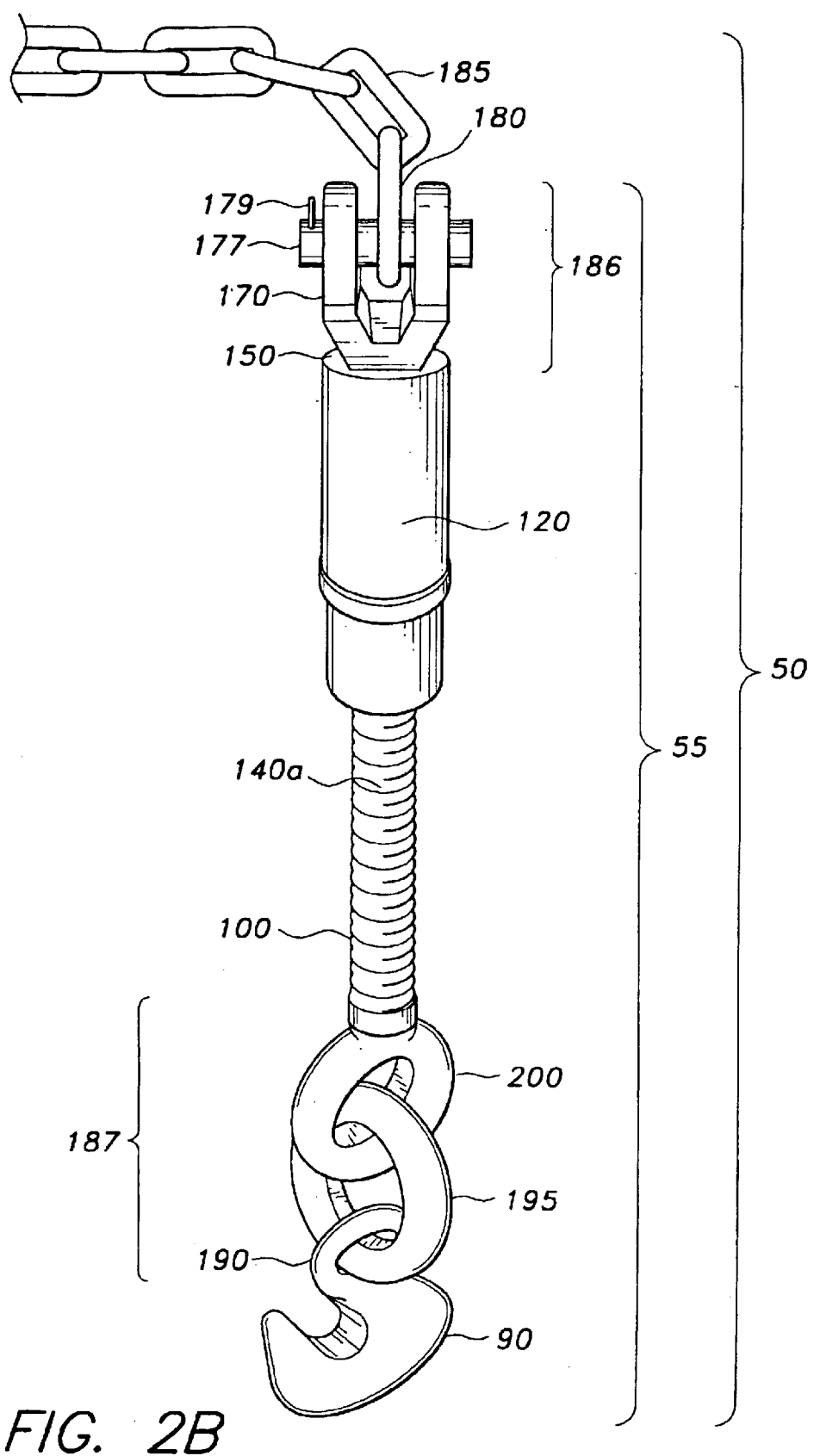
FIG. 2B is a further perspective view of the adjustable chain according to one aspect of the present invention.

In one embodiment of the invention, the upper end 150 of female shank member 120 comprises a first attachment mechanism 186 (e.g. see FIGS. 2, 4, 4A, 4B, and 4C) in the form of an integral U-shaped member 170 with ends 172a and 172b comprising through-holes in the form of aligned apertures 174a and 174b, respectively. The U-shaped member 170 is adapted to accommodate a securing bolt 177 which fits transversely through aligned apertures 174a and 174b, thereby providing the first attachment mechanism 186 attaching the shank 120 to the elongated flexible member, which in the depicted embodiment of FIG. 2 is a chain 185. In this embodiment, the securing bolt 177 is held in place by a bolt securing pin 179. For additionally safety, the bolt 177 may have a bolt securing pin 179 at both ends of the bolt 177 as depicted in, for example, FIG. 2A.

It should be understood that the first attachment mechanism 186, connecting the upper region 150 of female shank 120 to chain 185, can vary in configuration. For example, in FIG. 2A, the first attachment mechanism 186 takes the form of an upper end 150 of female shank member 120', which defines an attachment aperture 160 (shown as a dashed line). The U-shaped member 170 is attached to the upper end 150 through the attachment aperture 160. A chain link 180 is attached to the U-shaped member 170 using the bolt 177 to attach the female shank member 120 to the chain 185. A cable or rope 202 and loop 204 may be used in place of chain link 180 and chain 185, respectively, as shown, for example, in FIG. 4A.

The adjustable chain 50 may be used in numerous ways. For example, the adjustable chain 50 may be attached to a cable dispenser attached to a roll-off/on dumpster truck. Because of the ability of the adjustable hook 55 to vary the length of the adjustable chain 50, the adjustable chain 50 may be drawn out by a truck operator 60 from the cable dispenser to approximately the location of a trash filled roll-on/off dumpster, and the length of the adjustable chain 50 adjusted using the adjustable hook member 55 to facilitate attaching the hook 90 to the dumpster prior to hauling the dumpster onto the dumpster truck. The adjustable chain 50 may be attached to a crane or other load lifting mechanism, wherein the adjustable chain 50 would facilitate a ground worker in attaching a load to the hook 90.

It should be understood that the elongated flexible member can take various forms such as a chain 185, cable or rope 202, or a band comprising of linkages akin to a wrist watch band. For example, the chain 185 may comprise of metal links or any material suitable for use as chain links (such as hard plastic links or metal such as steel chain links); the chain 185 may comprise of steel or any kind of alloy suitable for use in chains, or a synthetic plastic, such as a durable impact resistant plastic, e.g., acrylonitrile-butadiene-styrene (ABS).

It should be understood that the term "cable" encompasses anything resembling a cable such as a steel wire or rope 202. Where the elongated flexible member is a rope it may comprise of any kind of rope material, for example, threads of synthetic material such as nylon and polyester, or natural fibers like cotton, hemp, manila, and sisal. Other suitable rope materials include combinations of synthetic fibers such as nylon, polyester, and/or polypropylene.

The degree to which a cable can be stretched by an operator 60 may vary case by case and is, at least in part, influenced by the thickness (or cross-section area) of the cable 202. For example, in wet conditions a rope made of nylon can loose a significant amount of its ability to stretch, thus in wet conditions a thick rope of nylon may be too difficult for an operator 60 to stretch using body strength alone thereby providing a need for the adjustable chain 50, comprising adjustable hook 55.

It should also be understood that the U-shaped member 170 and bolt 177 combination may be used in different parts of the adjustable chain 50. For example, in FIG. 3A, the bolt 177 (shown as 177a and 177b at opposite ends of short chain 185b) is a threaded bolt with a bolt locking nut 178 (also shown as 178a and 178b) and is used to attach one opposite end of a short chain 185b to male member 100, and the other opposite end of the short chain 185b to hook 90. Thus, the U-shaped member 170, if present in the adjustable chain 50, may form, for example, an integral part of either ends of male member 100 and female shank 120. In addition, the U-shaped member 170 may form an integral part of hook 90 as shown, for example, in FIG. 3A.

The bolt 177 may by any suitable bolt. In one embodiment, as shown in FIG. 3A, the bolt 177 comprises a threaded shaft adapted to traverse through aligned apertures 174a and 174b and held in place with the locking nut 178. The U-shaped member 170 and associated bolt 177 may take the form of the locking arrangement for shackles as described U.S. Pat. No. 4,221,252, issued Sep. 9, 1980 to P. Bruce, which is incorporated by reference herein in its entirety.

In FIG. 3A, a second attachment mechanism 187 is disposed between male member 100 and hook 90. In this embodiment, the second attachment mechanism 187 comprises a short chain 185b and integral U-shaped members 170a and 170b, which are integral with threaded male member 100 and hook 90, respectively. The U-shaped members 170a and 170b are attached to the opposite ends of chain 185b by means of threaded bolt 177 and locking nut 178 which pass through aligned apertures (shown as dashed lines). FIG. 3B shows a side view of the lower region 102 of male member 100 with aligned apertures 174a and 174b.

Figure 4B:
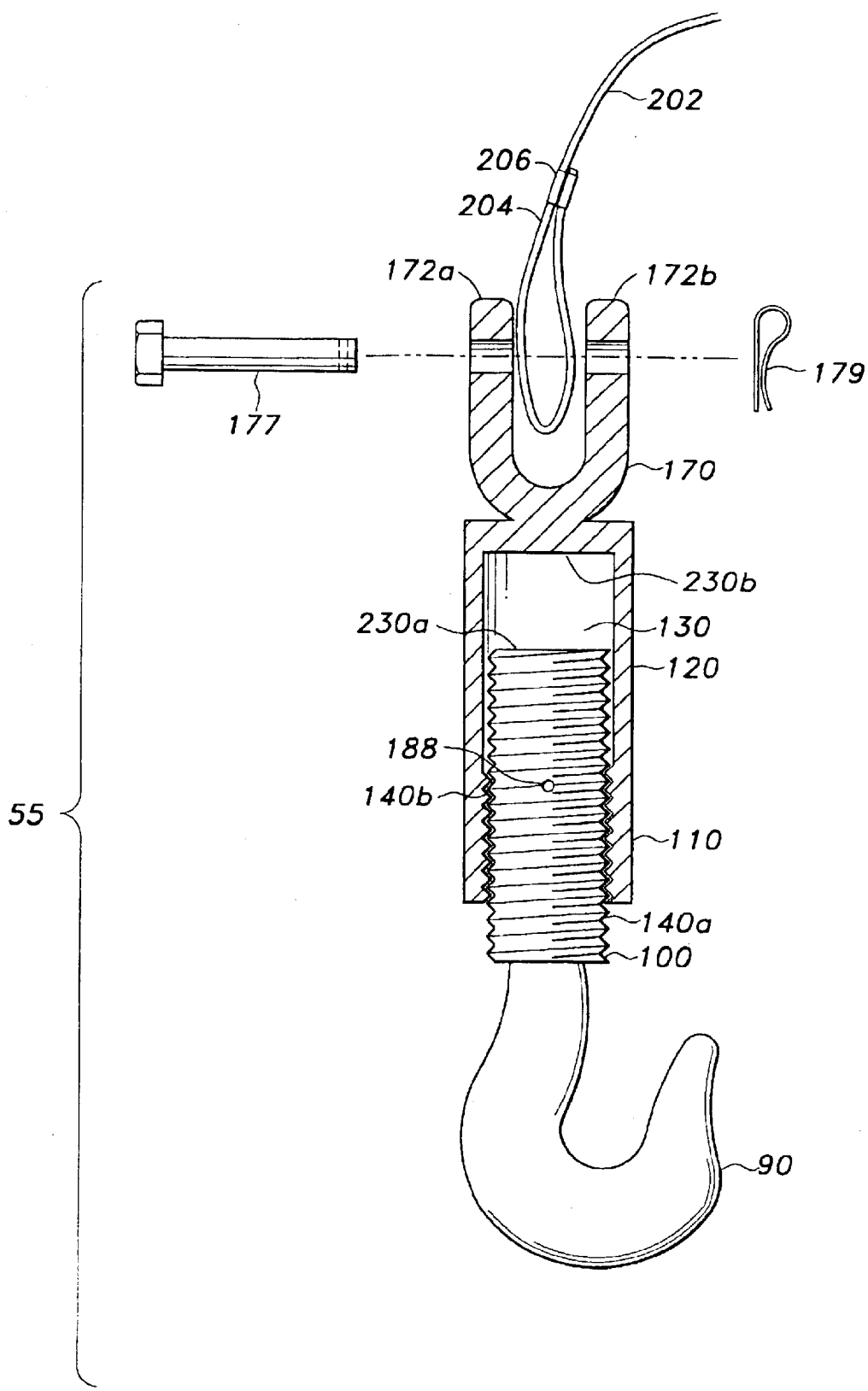
FIG. 4B is a cross-sectional view of the adjustable chain according to another aspect of the invention.

Referring to FIG. 4, which shows a perspective view of a further embodiment of the invention, the adjustable chain 50 comprises a safety feature in the form of a polit hole 188 in the first male thread 140a. The polit hole 188 should not be visible in normal use. Thus, when the polit hole 188 is exposed or visible, as shown in FIG. 4, or just visible, as in FIG. 4A, this would indicate that the male member 100 is over-extended out of female shank 120, and should be screwed back into the female shank 120 at least until the polit hole 188 returns inside the internal hollow bore 130 of shank 120 and is no longer visible. In FIG. 4B, the male member 100 is approximately 75% screwed into the female shank 120; consequently, the polit hole 188 would not be visible and the male member 100 is not over extended out of female shank 120.

In an alternative embodiment, the polit hole 188 takes the form of an indentation in thread 140a. In still another embodiment, the polit hole 188 is a luminescent mark. Thus, it should be understood that the polit hole 188 may take various forms.

Figure 4C:
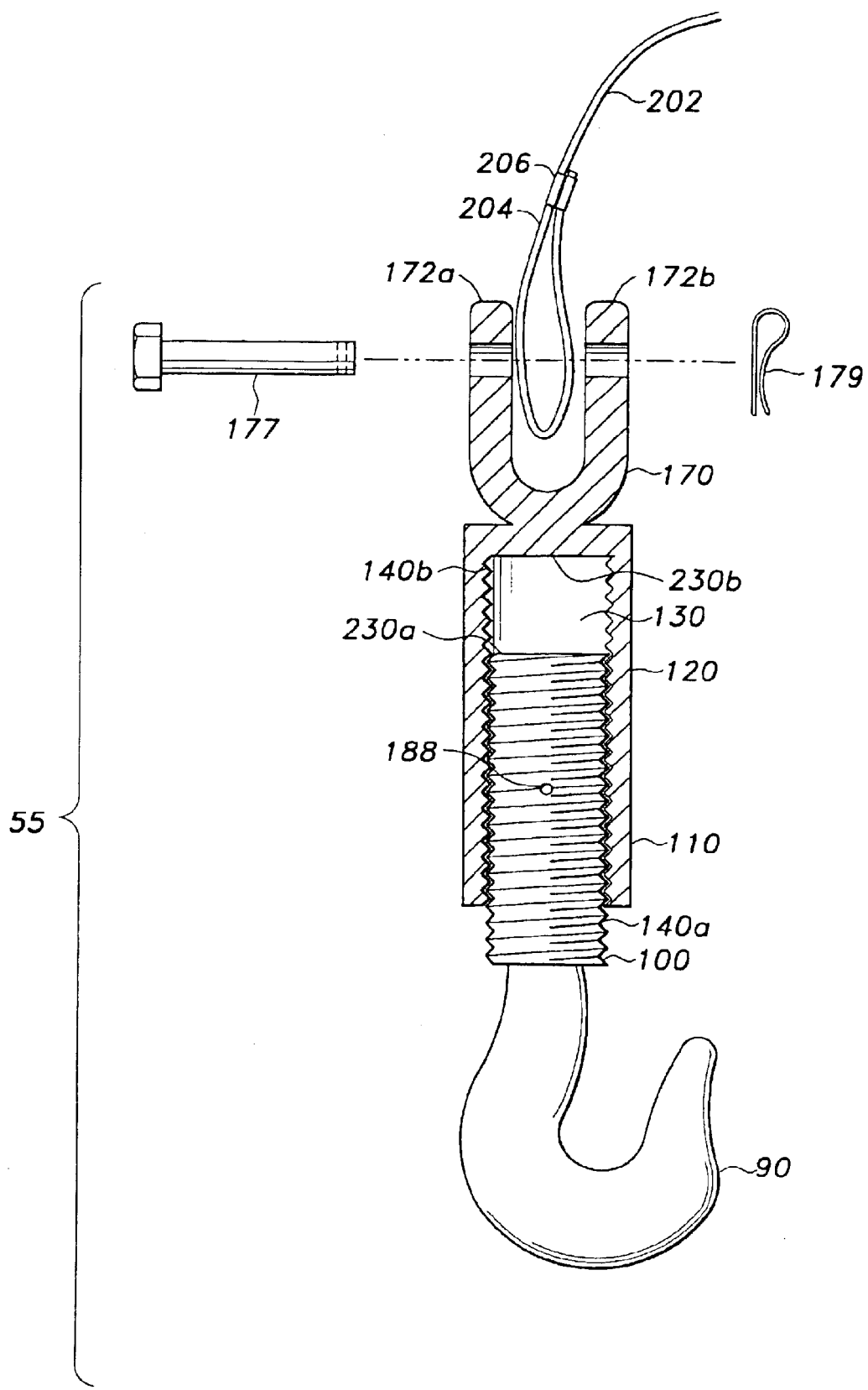
FIG. 4C is a cross-sectional view of the adjustable chain with a core substantially lined with a complementary thread according to another aspect of the invention.

In one embodiment of the invention as shown in FIGS. 4A and 4B, the hollow bore 130 of shank 120 is partly threaded with a complementary thread 140b at the first end 110 of the female shank 120. Alternatively, the bore 130 may be substantially lined with complementary thread 140b, as shown in FIGS. 4C and 6A, to ensure a more even spread of load throughout the length of the female shank 120 thereby decreasing the stress (and possible wear and tear) on, for example, the thread 140b as shown in FIG. 4C, or separate complementary threads 140b and 215b, as shown in FIG. 6A.

Figure 6A:
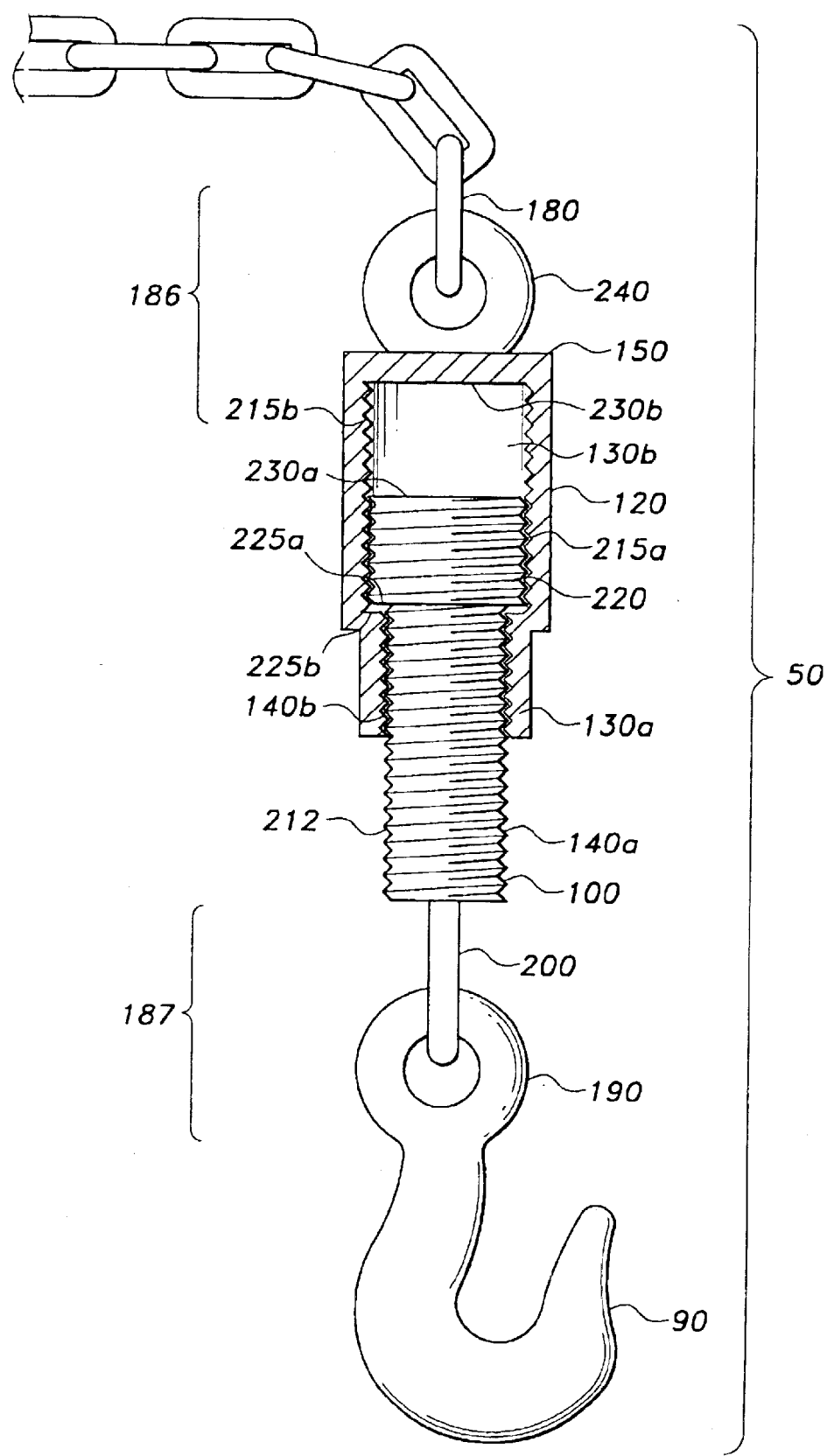
FIG. 6A is a perspective view, partly in section, of the adjustable chain according to another aspect of the invention.

It should be understood that the thread or threads lining the hollow bore 130 of female shank 120 may take various forms; the only constraint being that the threads lining the bore 130 should, at least to some extent, complement the external thread or threads of male member 100 (e.g. 140a and 215a as shown in FIG. 6A), and visa versa (i.e., threads 140a and 215a complement threads 140b and 215b, respectively).

In FIGS. 4A and 4B, a cable or rope 202 replaces chain 185. In one embodiment, the cable or rope 202 comprises a loop 204, which is secured by a sleeve 206. The cable or rope 202 is attached to the female shank by means of bolt 177. The bolt 177 can be held in place by any suitable pin or device such as bolt securing pin 179.

The elongated flexible member in the form of a cable or rope 202 may made of any suitable material able to withstand a load or force of the kind encountered in handling or securing a load, e.g., in the tying down of a load to the flat bed of a truck. The cable can be a steel cable comprising, for example, individual lengths of twisted steel wire. Alternatively, the cable may comprise a single length of steel wire. The cable or rope 202 may instead comprise of a large stout cord of strands of fibers, such as nylon, twisted or braided together to provide a length of cable or rope 202, wherein the cable 202 is difficult to stretch easily by a man or woman of ordinary strength.

The length of female shank 120 may vary, but regardless of its length it is important that the shank's 120 length is sufficient to accommodate a substantial portion of the upper region 105 of male member 100. More specifically, the length of hollow bore 130 of shank 120 should be sufficient to accommodate the upper region 105 of male member 100. In one embodiment, the shank's 120 hollow bore 130 is about 1 foot in length and the upper region 105 is of comparable length.

In another embodiment of the invention, the thread 140a of male member 100 comprises an oil galley 101 as shown in FIG. 5A. A cross-section view of the thread 140a with the oil galley 101 along line 5B—5B is shown in FIG. 5A.

Figure 6B:
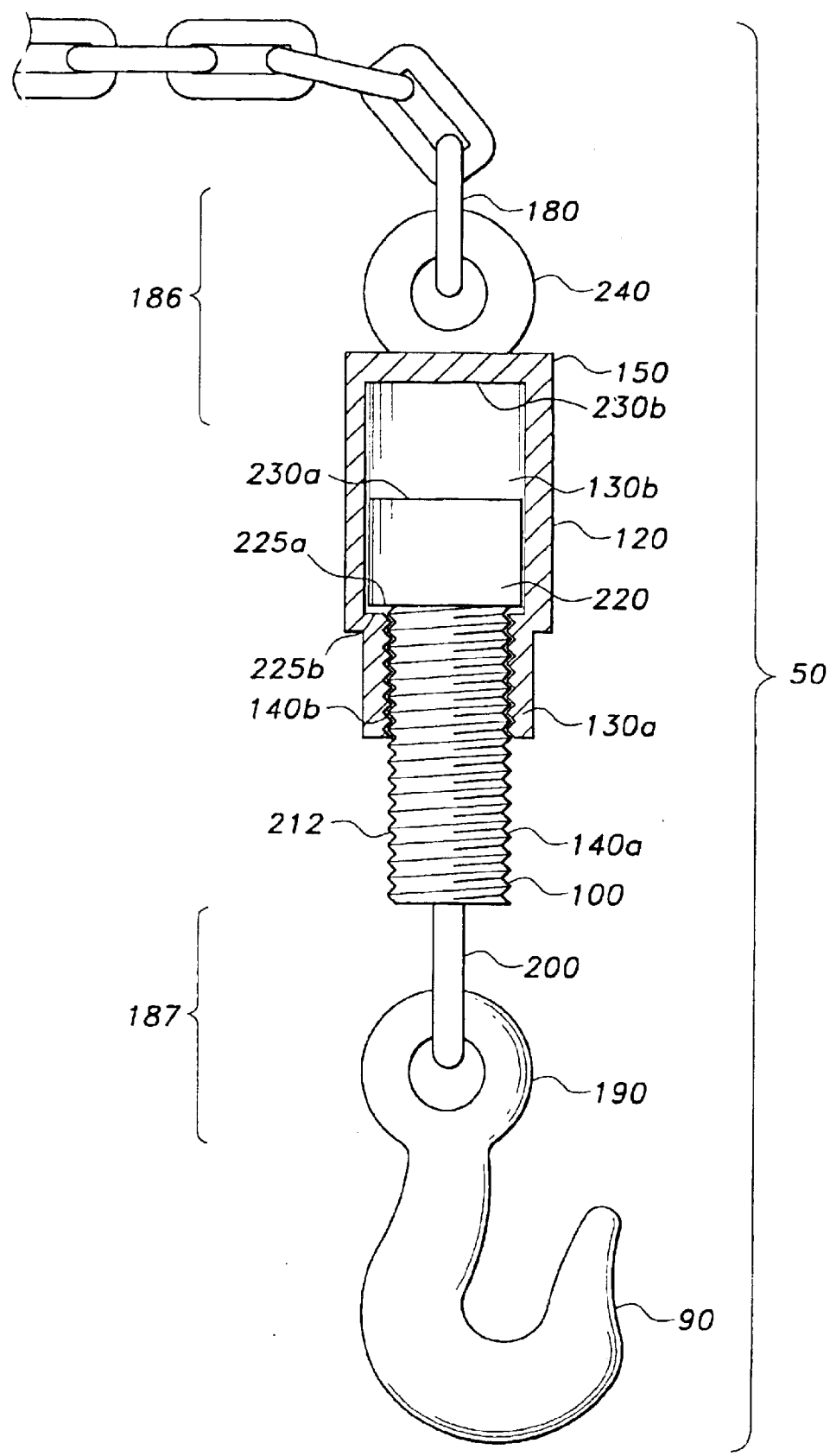
FIG. 6B is a perspective view, partly in section, of the adjustable chain according to another aspect of the present invention.
Figure 6C:
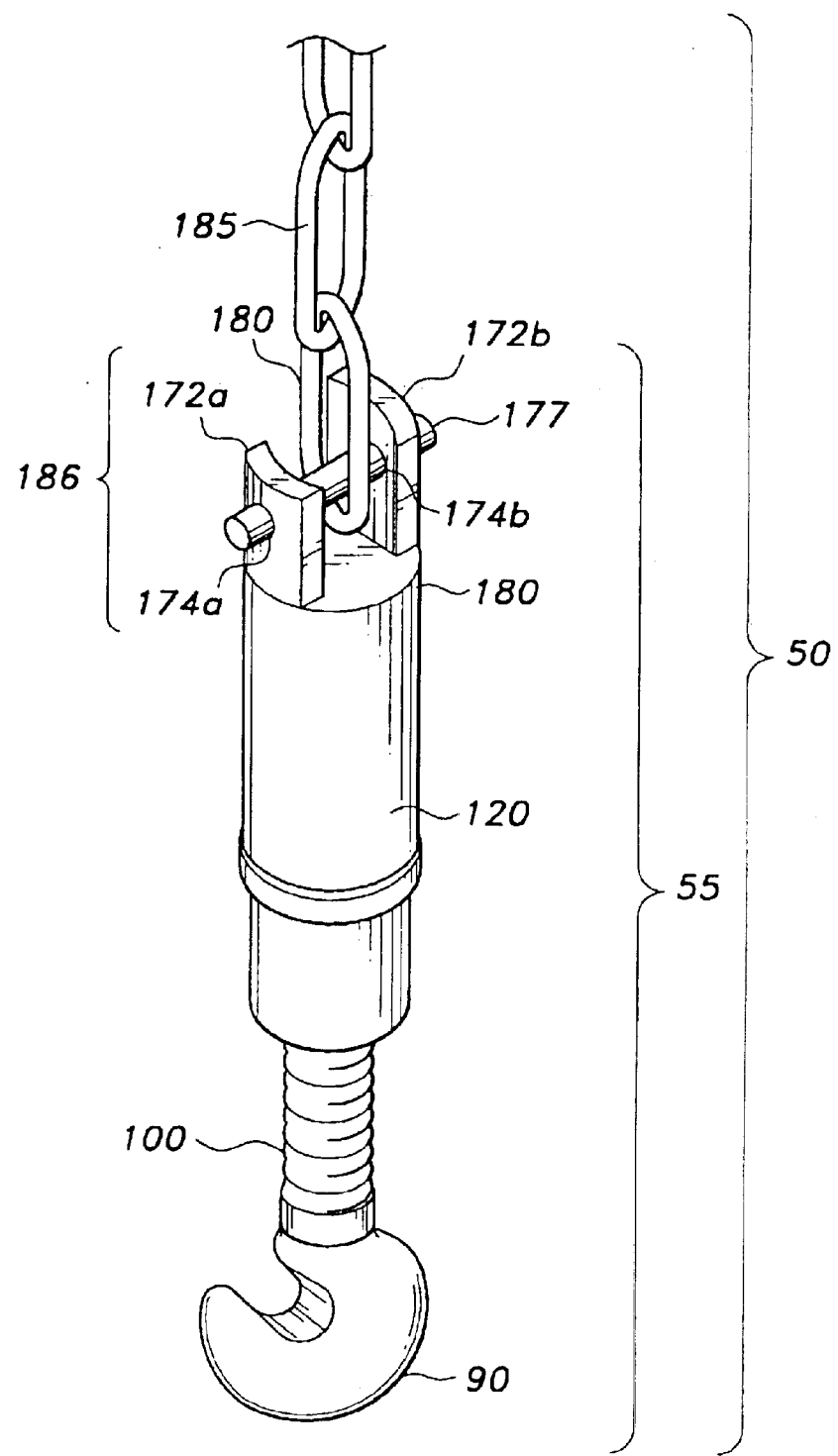
FIG. 6C is a perspective view of the adjustable chain according to another aspect of the present invention.

Referring to FIG. 6A, the male member 100 comprises a narrow section 212 and a widened section 220 lined with first male member thread 140a and a second male member thread 215a, respectively. The female shaft comprises of a narrow bore section 130a and a wider bore section 130b, lined with complementary threads first shank thread 140b and second shank thread 215b, respectively. In an alternative embodiment (FIG. 6B), the widened section 220 and wider bore section 130b lack threads 215a and 215b, respectively.

Still referring to FIG. 6A, the hook 90 has an integral hook-eye 190 through which is interlocked a second eye 200 integral with the narrow male bore section 212 of male member 100. Hence, in this embodiment the female shank 120 comprises a hollow bore in two parts, a narrow bore section 130a continuous with a wider bore section 130b; and the male member 100 comprises a male shaft in two parts, 212 and 220.

The embodiment of the invention as depicted in FIG. 6A, possesses several complementary and integral safety features. For example, female shank 120 includes internal shank flanking ledge 225b, and the widened section 220 of male bore 100 comprises complementary flanking ledge 225a, which can abut against the shank flanking ledge 225b, thus stopping, for example, an over zealous employee from attempting to screw too much of bore 100 out of female shank 120. Thus, an operator is automatically prevented from over-extending bore male bore 100 outward from female shank 120. This safety feature is particularly useful during low lighting or bad weather conditions when a cargo handler might not otherwise see if the male bore 100 is over extended outwards from female shank 120. This embodiment of the invention eliminates the need for the polit hole 188.

Still referring to FIG. 6A, the widened section 220 further comprises a top face 230a, and the female shank 120 further comprises an internal face 230b. In one embodiment of the invention, the top face 230a abuts up against the top internal face 230b of female shank 120 when male bore 100 is fully screwed into female shank 120. Thus, in this embodiment, an operator screwing male bore 100 fully into female shank 120 would notice that more torque is required to turn male bore 100 thus warning the operator that male bore 100 should not be further turned or tightened to avoid stripping complementary pairs of threads 215a and 215b, and 215a and 215b, respectively. In this embodiment, the operator 60 can screw male member 100 into and out of female shank member 120 subject to contact between flanking ledges 225a and 225b, and between faces 230a and 230b.

Still referring to FIG. 6A, the second attachment mechanism 187 comprises a second eye 200 connected to hook-eye 190 via a further link 195. It should be understood that the second attachment mechanism 187 can vary in configuration. For example, as described previously, the second attachment mechanism 187 in FIG. 3A comprises the short chain 185b and integral U-shaped members 170a and 170b, which are integral with threaded male member 100 and hook 90, respectively.

Still referring to FIG. 6A, in this embodiment, female shank 120 further comprises a chain attachment means in the form of a shank-eye 240, which is shown attached to a chain link 185 of chain 185 (not shown). It should be understood that the attachment means between the female shank 120 and the chain 180 is not critical and can vary. The chain attachment means should be strong enough to withstand the load expected on hook 90.

Thus, the embodiment of the invention as shown in FIG. 6A comprises a longitudinal male bore 100 and a female shank 120, in which one end of the male bore comprises a widened section 220 somewhat resembling the profile of a piston shaft leading to a piston head in an internal combustion engine. In addition, the female shank 120 and male bore 100 further comprise of complementary threads 140a and 140b, and 215a and 215b, respectively. Further, the embodiment as disclosed in FIG. 6A provides integral safety features to help an operator avoid damaging or using the adjustable hook 55 of the adjustable chain 50 in an unsafe manner.

Figures 7A, 7B:
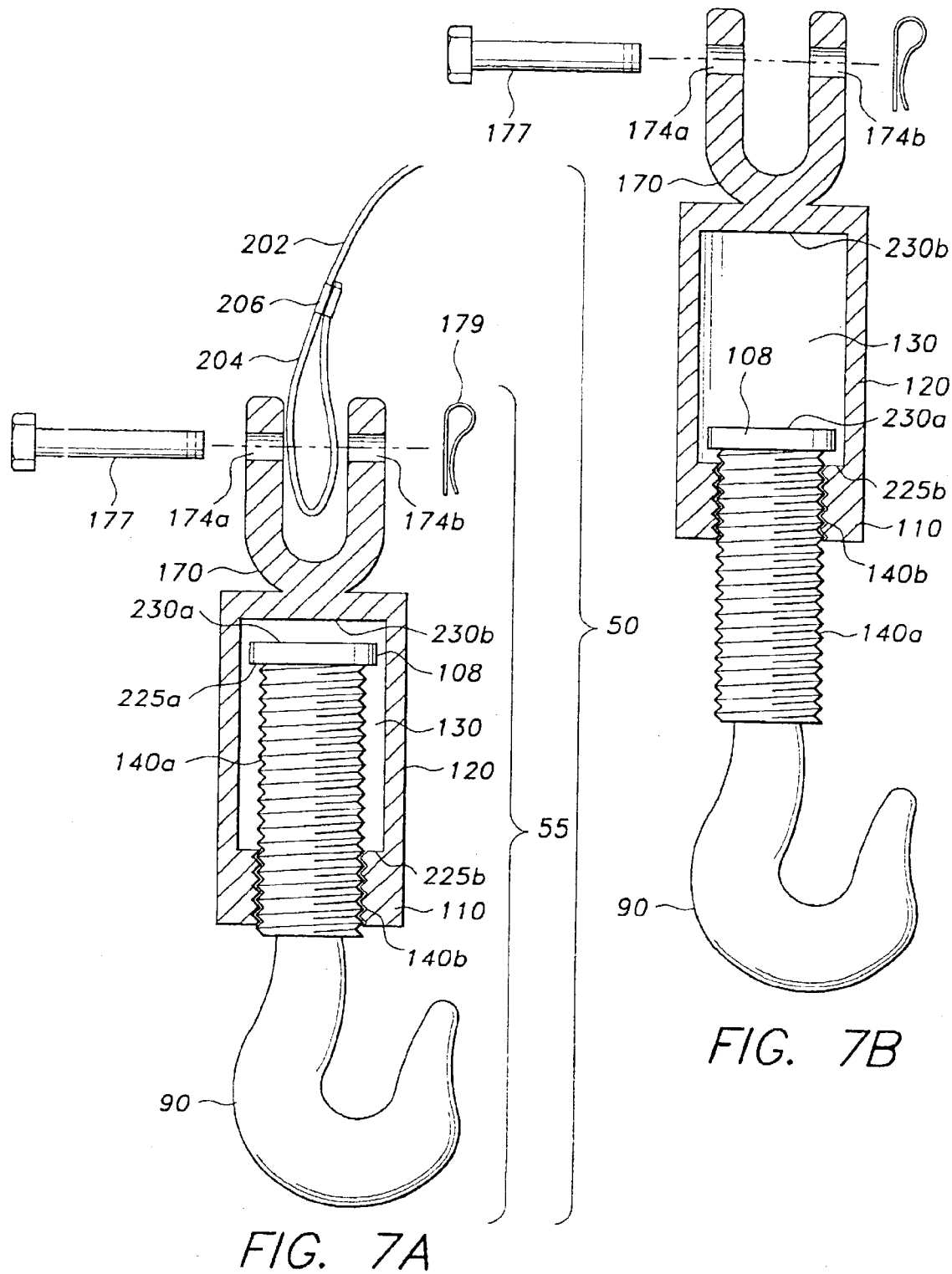
FIG. 7A is a cross-sectional view of the adjustable chain with a male shaft comprising a safety feature according to another aspect of the invention.
FIG. 7B is a view of the embodiment of FIG. 7A, wherein the male member is prevented from exiting the female shaft member.

Referring to FIG. 7A, the top region of male member 100 comprises a base 108. Thus, any attempt to over extend male member 100 outwards from shank 120 is prevented because the base 108 abuts up against ledge 225b inside hollow bore 130 as shown in FIG. 7B. In this embodiment, the complementary thread 140b is limited to the bore 130 at the end 110 of shank 120.

Figure 8A:
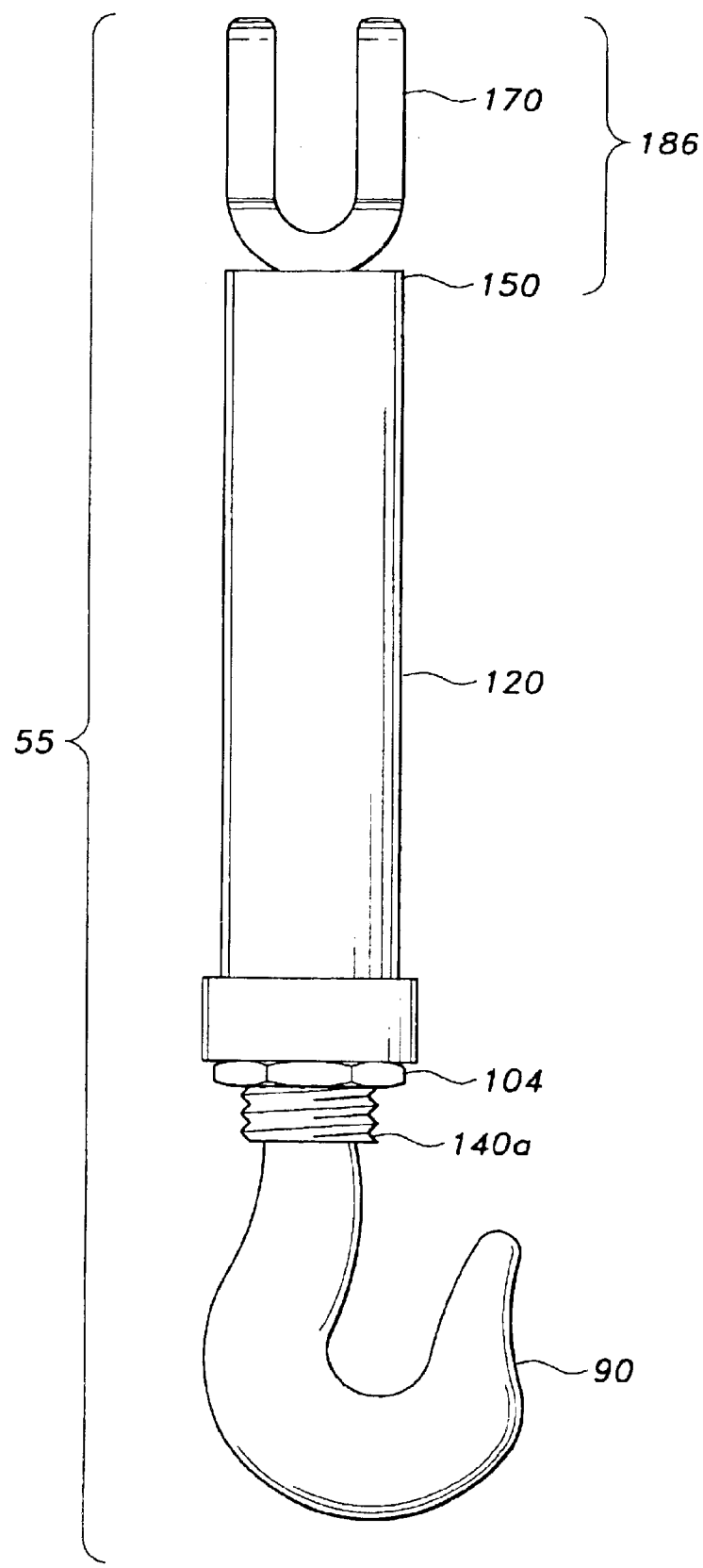
FIG. 8A is an elevational view of the adjustable chain comprising a locking nut according to one aspect of the invention.
Figure 8B:
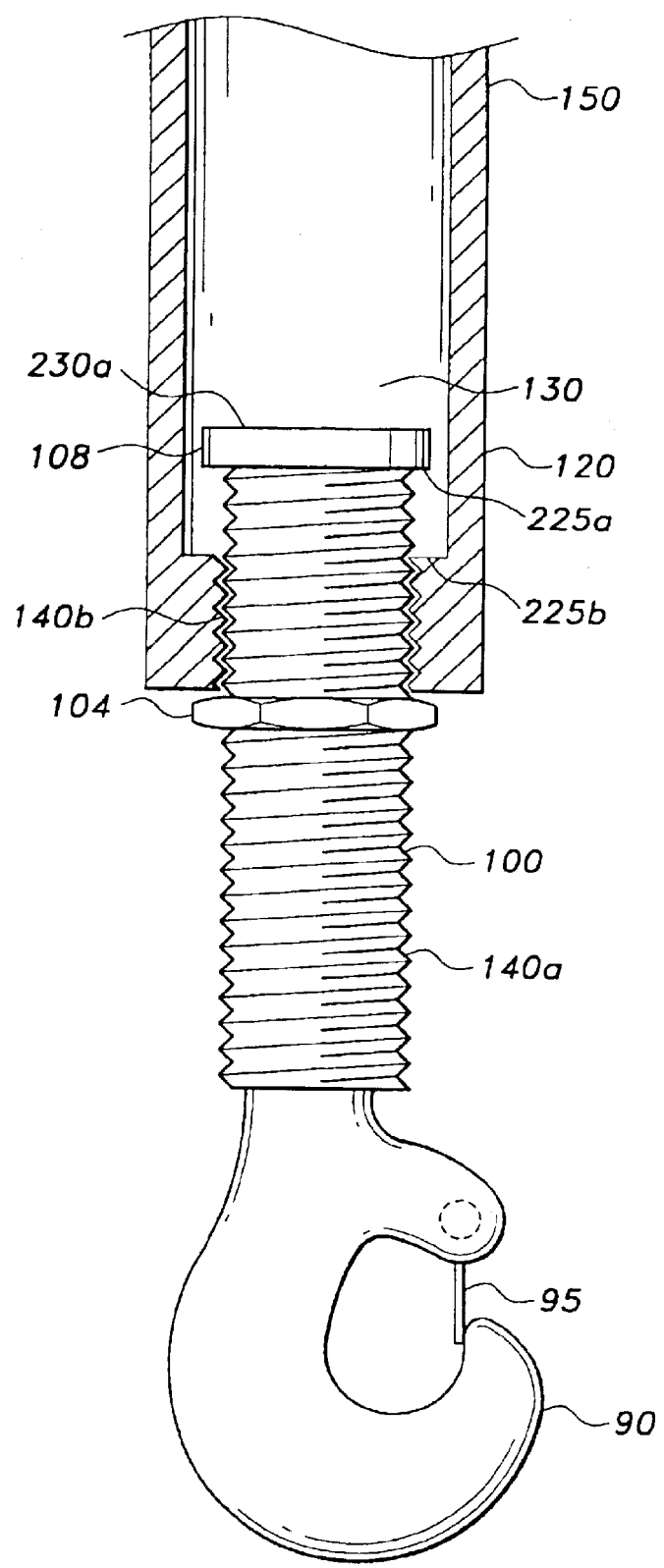
FIG. 8B is a sectional view of the adjustable chain comprising a locking mechanism according to another aspect of the invention, the female shaft is shown in cross section.
Figure 8C:
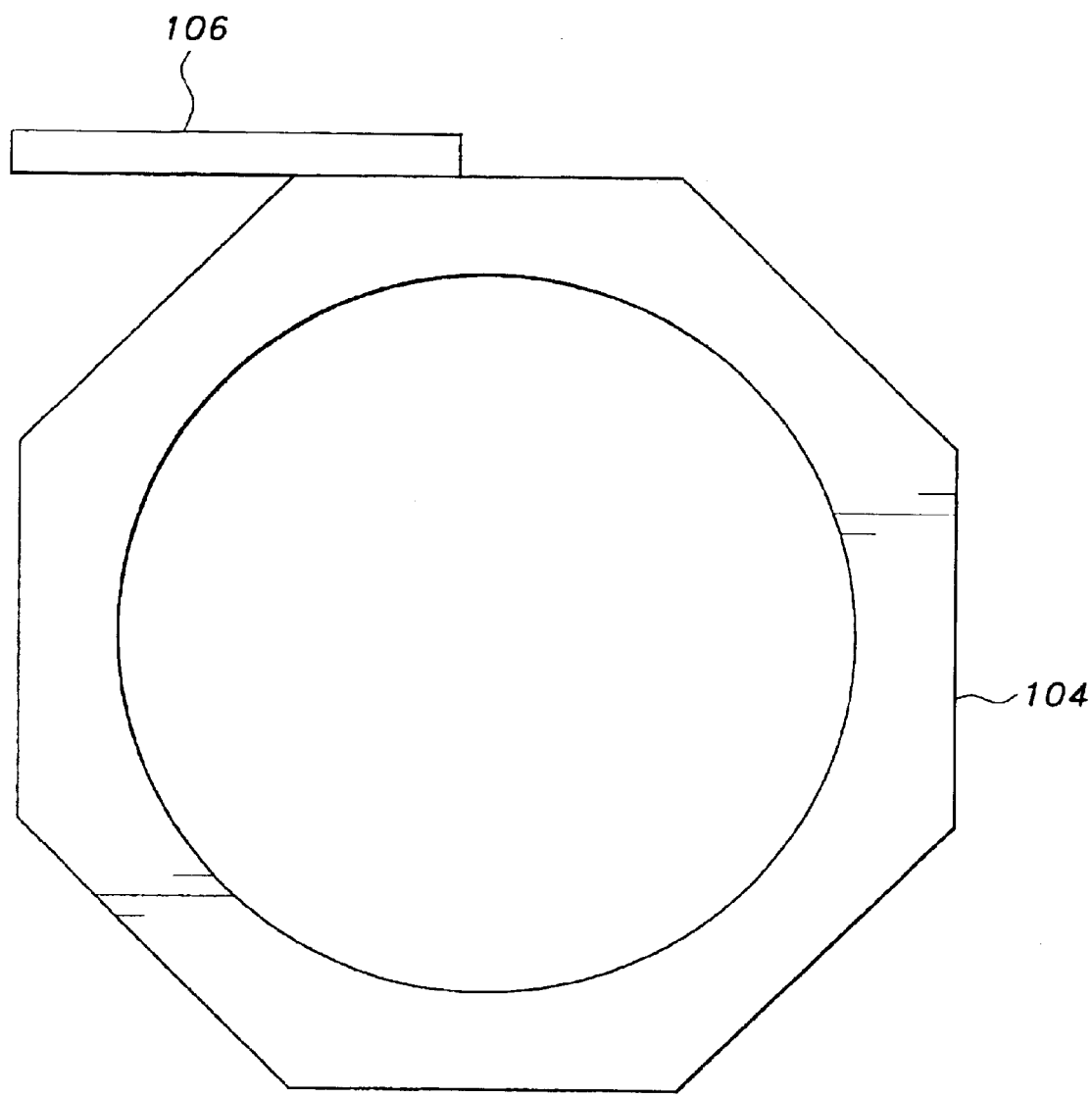
FIG. 8C is an enlarged scale top view of a locking nut according to another aspect of the invention.

In an alternative embodiment, the male shaft member 100 comprises a lock nut 104 as shown in FIGS. 8A and 8B. The lock nut 104 has an internal thread complementary to thread 140a of male member 100 so that the lock nut 104 can be positioned anywhere along the thread 140a thereby permitting the operator to predetermine how far male shaft member 100 can be screwed into female shank member 120. In addition, it should be immediately evident that the combination of complementary ledges 225a and 225b, complementary faces 230a and 230b, together with locking nut 104 provides the operator with a combination of safety features to prevent male shaft 100 being over screwed into the female shank 120 or inadvertently screwed too far out of the female shank member 120, respectively (see FIG. 8B). A top view of lock nut 104 is shown in FIG. 8C.

The lock nut 104 may further comprise a leverage grip pin 106 (see FIG. 8C) or equivalent welded to the lock nut 104 to provide an operator with extra leverage in the event the lock nut 104 proves to be stiff to turn along thread 140a.

Figure 9A:
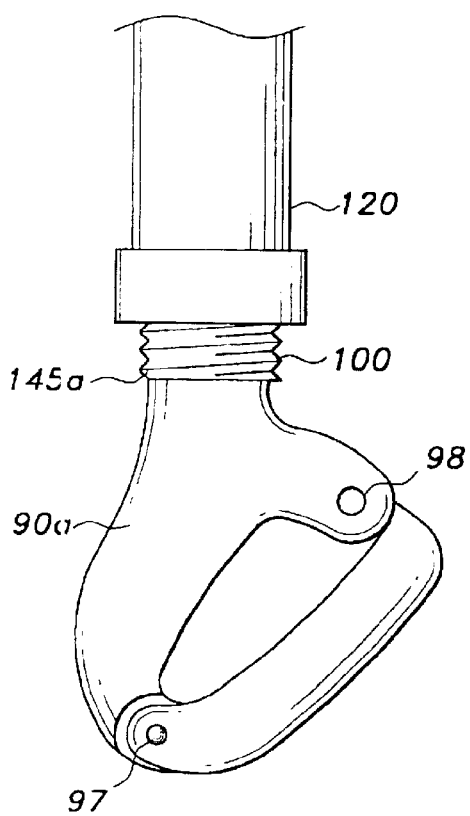
FIG. 9A is an elevational view of the adjustable chain comprising a hook locking mechanism according to another aspect of the invention.
Figure 9B:
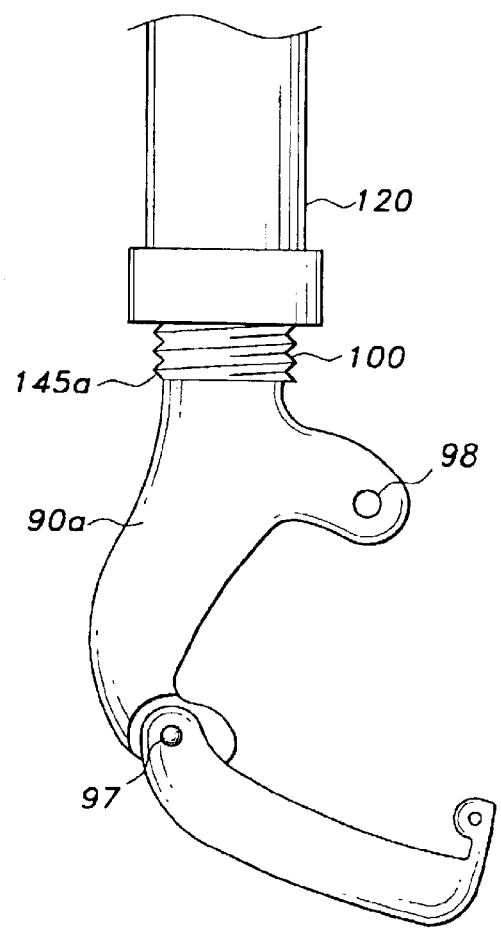
FIG. 9B is an elevational view of the adjustable chain of FIG. 9A, but with the locking mechanism in an open position.

The hook 90 may take various forms. In FIG. 8C the hook comprises a locking pin 95 which helps prevent the hook 90 detaching from a load. In FIG. 9A the hook 90 comprises two parts which open and close about a hinge 97 (see FIG. 9B). An optional release mechanism 98 helps prevent the hook 90 detaching from e.g. an anchoring point on a truck 80 when the hook 90 is in a substantially horizontal position and the load or object might otherwise detach or slip from the hook 90.

Figure 10A:
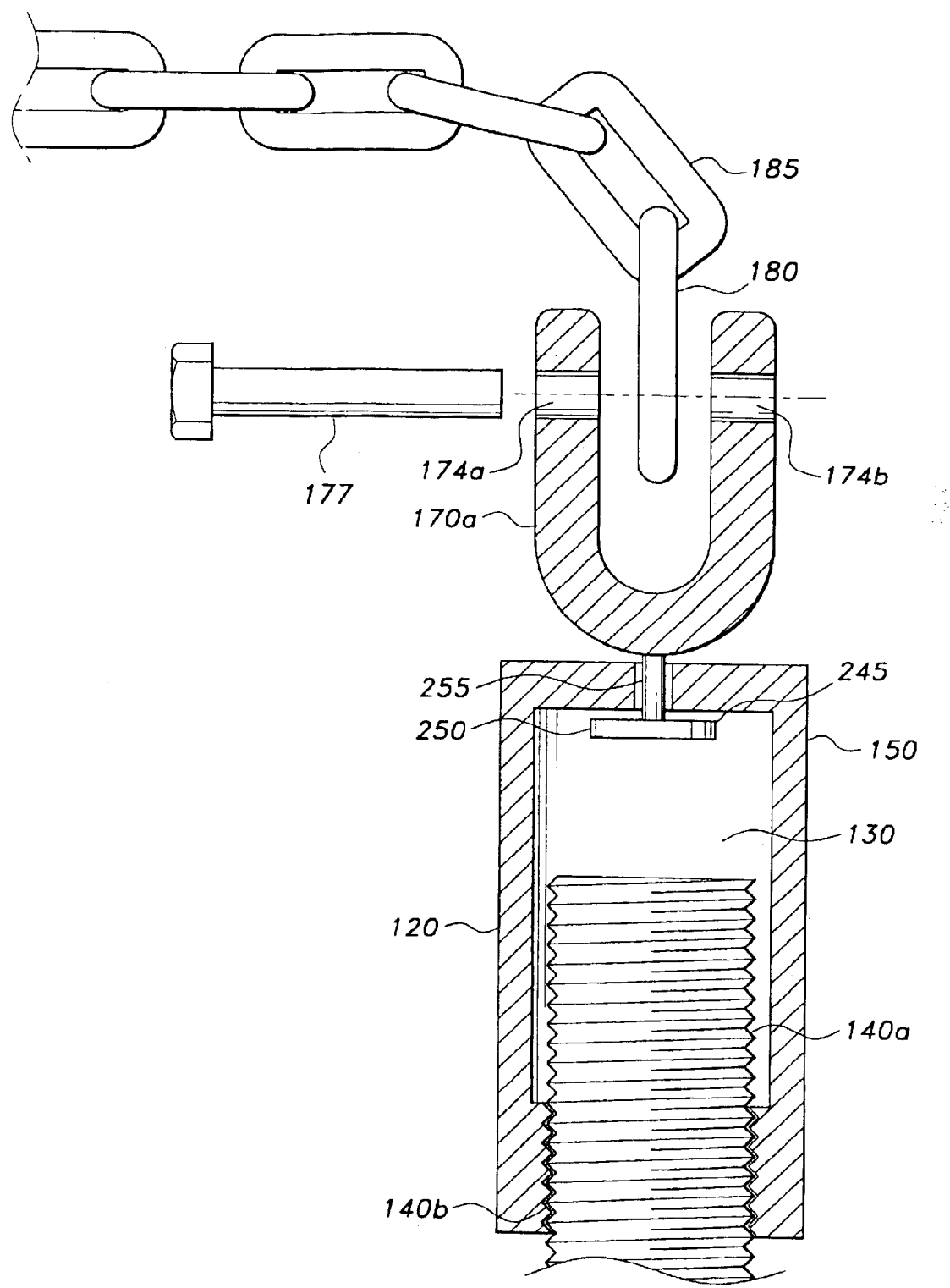
FIG. 10A is a partial sectional view of the adjustable chain comprising a turning member operably connected to the upper region of the female shaft according to another aspect of the invention; the female shaft, and a U-shaped member are shown in cross section.

In another embodiment of the invention, the adjustable hook 55 of adjustable chain 50 comprises a turning member 245 which may be adapted to fit inside the male member 100 or female shank 120. For example, in FIG. 10A the turning member 245 is fitted to the upper end 150 of female shank 120. In this embodiment the turning member 245 comprises a base 250 inside hollow bore 130 attached to a first opposite end of shaft 255, and an independent U-shaped member 170a, which is connected to a second opposite end of shaft 255. The U-shaped member 170a is shown connected to a chain link 180 of chain 185.

The base 250 and/or shaft 255 may be Teflon coated for durability and ease of use. In another embodiment, the base 250 comprises an internal bearing or set of bearings (not shown) to allow shaft 255 to turn freely and independent of base 250.

Figure 10B:
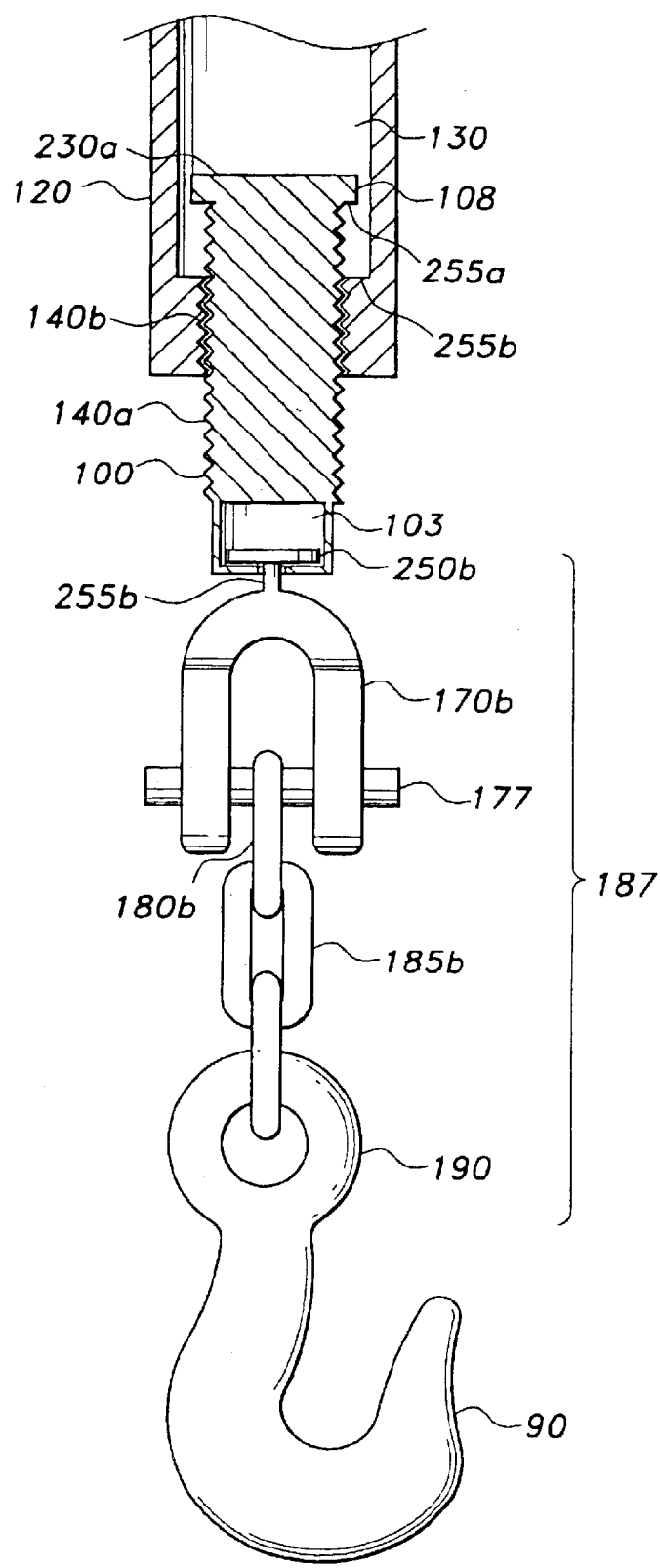
FIG. 10B is a partial sectional view of the adjustable chain comprising a turning member operably connected to the lower region of the male member; the female shaft, male member, and a U-shaped member are shown in cross section.

It should be understood that the turning member 245 can take various forms and be incorporated at various positions within the adjustable chain 50. For example, in FIG. 10B the male member 100 comprises a hollow bore 103 adapted to accommodate base 250b attached to shaft 255 integral with U-shaped member 170b, which is thus able to turn relative to male member 100, and visa versa, e.g. male member 100 can be turned while keeping U-shaped member 170b stationery and thus avoiding twists in short chain 185b and also thereby avoiding rotation of hook 90 attached to chain 185b.

The turning member 245 permits the operator 60 to adjust the overall length of the adjustable chain without causing twists in the elongated flexible member such as chain 185 or cable (or rope) 202.

If the turning member 245 is disposed between the elongated chain member and the female shank (as shown, for example in FIG. 10A), the female shank 120 may be rotated, without causing twists in the elongated flexible member, about its longitudinal axis thereby causing the male member 100 to either enter or exit from the bore 130 depending on whether the female shank 120 is rotated clockwise or anti-clockwise.

If the turning member 245 is disposed between the male member 100 and hook 90 (as shown, for example in FIG. 10B), the male member 100 may be turned about its longitudinal axis, without causing the hook 90 to rotate. The male member 100 can thereby be screwed into or out of the bore 130 of female shank 120 without rotating the hook 90.

Figure 10C:
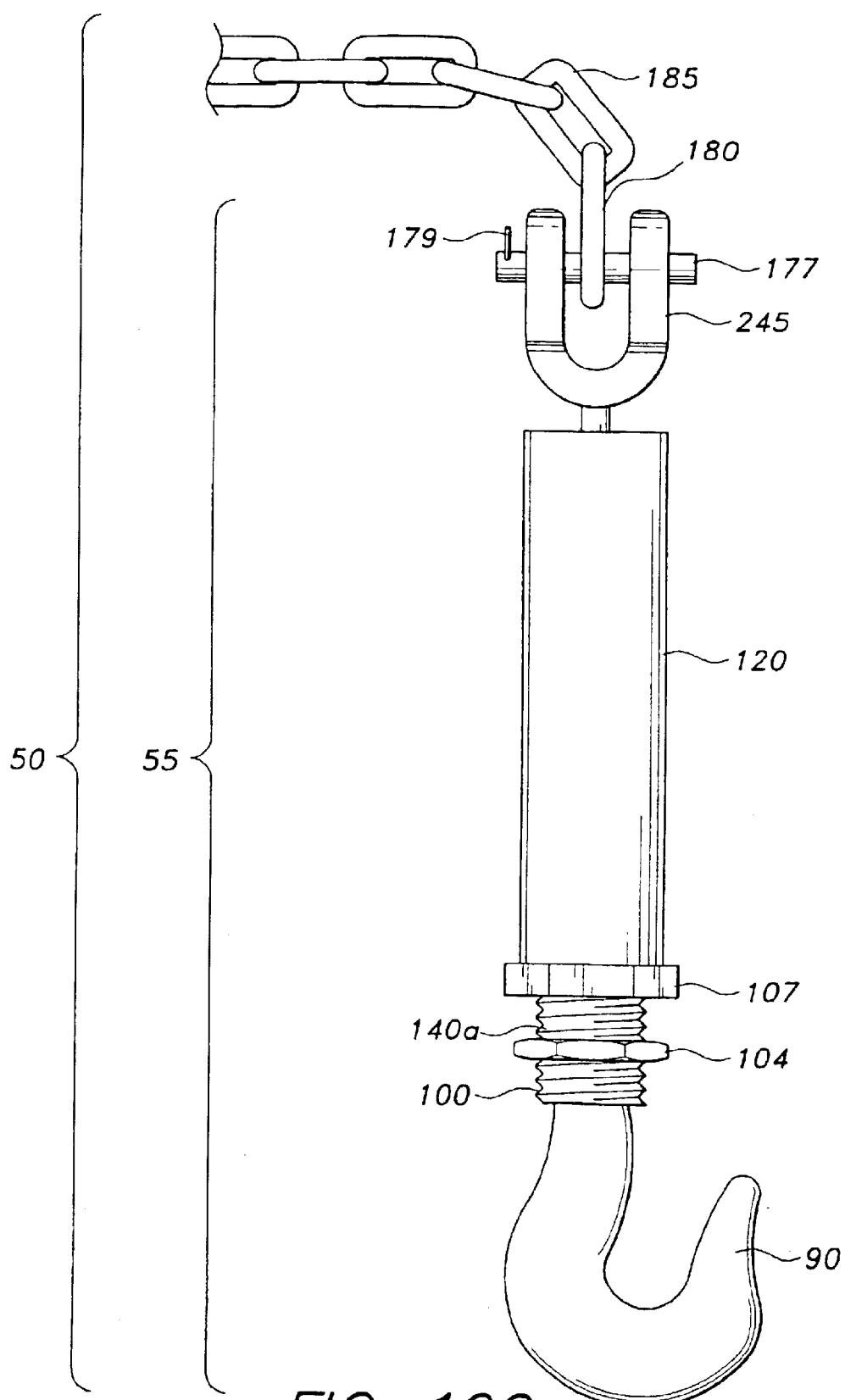
FIG. 10C is an elevational view of the adjustable chain comprising a locking nut and a flange rigidly affixed to a female shaft according to one aspect of the invention.

In another embodiment, as shown in FIG. 10C, a flange 107 is rigidly affixed to the female shaft 120 of adjustable hook 55, such as the end of shaft 120 as shown in FIG. 10C. The flange 107 is adapted to be gripped by a gripping device such as a wrench or functional equivalent thereof. The flange 107 is preferably shaped like a nut and thus inherently adapted to be gripped by a wrench type device to enable an operator 60 to turn and tighten shaft 120 and thereby further tighten the shaft against nut 104 or its equivalent; conversely the shaft 120 could be loosened using a suitable wrench.

Still referring to FIG. 10c, in a preferred embodiment, the flange 107 is integral with and forms part of the shaft 120; thus if flange 107 is rotated or turned, the shaft 120 is also turned to the same extent and in the same clockwise or anticlockwise direction depending on which direction flange 107 is turned. The turning mechanism 245 allows the female shaft 120 to be tightened (or loosened) against nut 104 by using a wrench to turn flange 107 and hence shaft 120. The flange 107 (and hence shaft 120) is thereby tightened against nut 104 sitting on thread 140d independently of the elongated flexible member such as a chain 185.

Figure 11:
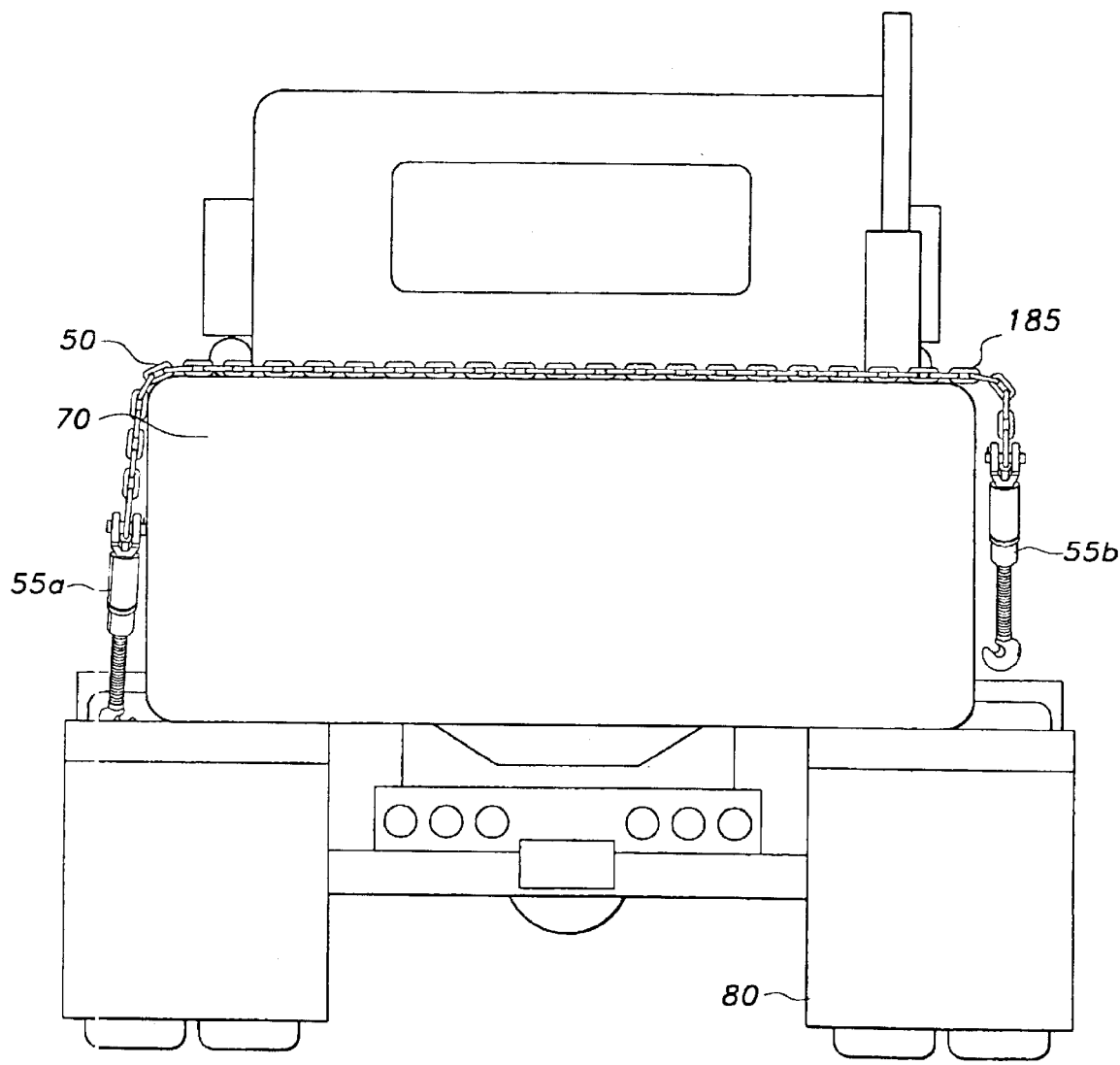
FIG. 11 is an environmental view of the adjustable chain comprising an adjustable hook at opposite ends of an elongated flexible member in the form of a chain, according to another aspect of the invention.

In another embodiment of the invention (FIG. 11), the adjustable chain 50 comprises an elongated member in the form of a chain 185 (or its functional equivalent such as a steel wire 202 or rope) with adjustable hooks 55 at both ends of the chain 180. Hence, in this embodiment the adjustable chain 50 comprises first and second adjustable hooks 55a and 55b, respectively, at the first and second ends of chain 185, respectively.

It should be understood that more than one adjustable hook 55 may be attached to any part of the elongated member. For example, a first adjustable hook 55a may be attached to a chain link 180 several links from one end of chain 185; and the second adjustable hook 55b may be attached to another link 180 somewhere else along the chain 185. Such variable locations of adjustable hook 55 with respect to chain 185 may be achieved by attaching the U-shaped member 170 to different links 180 along chain 185 as desired by the operator 60. Alternatively, at least two adjustable hooks 55 may be attached at different positions along the elongated flexible member 55. In another embodiment, the flange 107 is rigidly affixed to at least one of shafts 120 of the at least two adjustable hooks 55.

It is to be understood that the present invention is not limited to the embodiments described above, but encompasses any and all embodiments within the scope of the following claims.

I claim:

1. An adjustable hook comprising:
a female shank, wherein the female shank has a hollow bore comprising a first shank thread, an upper end and an opposite lower end;
a male longitudinal member comprising an upper region with a first male thread that complements the first shank thread, and a lower region, wherein the upper region is adapted to fit inside the bore;
wherein the first male thread further comprises a pilot hole which is positioned in the first male thread such that if the pilot hole is visible this is indicative that the male member is over extended from the female shank; and
a hook on the lower region of the male member.

2. The adjustable hook of claim 1, wherein the upper region of the male member further comprises a male member widened section with a second male thread, and the female shank further comprises a widened shank section with a second shank thread which complements the second male thread, wherein the widened shank section is adapted to accommodate the male member widened section.

3. The adjustable hook of claim 2, wherein the widened shank section further comprises an internal shank flanking ledge, and the male member widened section further comprises a complementary flanking ledge, wherein when the complementary flanking ledge abuts the internal shank flanking ledge, the longitudinal male member is prevented from exiting further from the female shank.

4. The adjustable hook of claim 3, wherein the female shank further comprises an internal face, and the widened section further comprises a top face, wherein the top face abuts against the internal face when the male member is fully screwed into the female shank.

5. The adjustable hook of claim 1, wherein the adjustable hook further comprises a turning member attached to the upper end of the female shank.

6. The adjustable hook of claim 5, wherein the female shank further comprises a flange adapted to be gripped by a wrench type device.

7. The adjustable hook of claim 1, wherein the adjustable hook further comprises a turning member between the lower region of the male member and the hook.

8. The adjustable hook of claim 1, wherein the male member further comprises an oil galley.

9. The adjustable hook of claim 1, wherein the hook comprises two parts which open and close about a hinge.

10. The adjustable hook of claim 1, wherein the hook comprises a locking pin.

11. An adjustable chain comprising:
an elongated flexible member;
a female shank attached to the elongated flexible member, wherein the female shank has a hollow bore comprising a first shank thread, an upper end proximate to the elongated flexible member and an opposite lower end;
a male longitudinal member comprising an upper region with a first male thread that complements the first shank thread, and a lower region, wherein the upper region is adapted to fit inside the bore;
wherein the upper region of the male member further comprises a male member widened section with a second male thread, and the female shank further comprises a widened shank section with a second shank thread which complements the second male thread, wherein the widened shank section is adapted to accommodate the male member widened section; and
a hook on the lower region of the male member.

12. The adjustable chain of claim 11, wherein the first male thread further comprises a pilot hole which is positioned in the first male thread such that if the pilot hole is visible this is indicative that the male member is over extended from the female shank.

13. The adjustable chain of claim 11, wherein the widened shank section further comprises an internal shank flanking ledge, and the male member widened section further comprises a complementary flanking ledge, wherein when the complementary flanking ledge abuts the internal shank flanking ledge, the longitudinal male member is prevented from exiting further from the female shank.

14. The adjustable chain of claim 13, wherein the female shank further comprises an internal face, and the widened section further comprises a top face, wherein the top face abuts against the internal face when the male member is fully screwed into the female shank.

15. The adjustable chain of claim 11, wherein the elongated flexible member is selected from the group consisting of a chain with at least one chain link, a cable, and a rope.

16. The adjustable chain of claim 11, wherein the adjustable chain further comprises a turning member between the female shank and the elongated flexible member.

17. The adjustable chain of claim 11, wherein the adjustable chain further comprises a turning member between the male member and the hook.

18. The adjustable chain of claim 11, wherein the adjustable chain further comprises a turning member between the female shank and the elongated flexible member, and wherein the female shank further comprises a flange adapted to be gripped by a wrench type device.

* * * * *